(12) United States Patent
McManus

(10) Patent No.: US 6,345,854 B1
(45) Date of Patent: Feb. 12, 2002

(54) MECHANISM FOR SYNCHRONIZING AND CONTROLLING MULTIPLE ACTUATORS OF A SLIDE OUT ROOM OF MOBILE LIVING QUARTERS

(75) Inventor: Patrick W. McManus, Osceola, IN (US)

(73) Assignee: VT Holdings II, Inc., Reno, NV (US)

( * ) Notice: Subject to any disclaimer, the term of this patent is extended or adjusted under 35 U.S.C. 154(b) by 0 days.

(21) Appl. No.: 09/411,019

(22) Filed: Oct. 1, 1999

Related U.S. Application Data

(63) Continuation-in-part of application No. 09/220,165, filed on Dec. 23, 1998, now abandoned.

(51) Int. Cl.⁷ .............................. B60P 3/34; B60P 3/35
(52) U.S. Cl. ..................... 296/26.13; 296/175; 296/165
(58) Field of Search .......................... 296/26.13, 26.12, 296/26.01, 171, 172, 173, 175, 176, 165

(56) References Cited

U.S. PATENT DOCUMENTS

| | | | |
|---|---|---|---|
| 1,943,280 A | | 1/1934 | Arnold |
| 2,368,748 A | | 2/1945 | Doty |
| 2,704,223 A | * | 3/1955 | Houdart .................... 296/26.13 |
| 2,831,722 A | | 4/1958 | Hanson et al. |
| 2,842,972 A | * | 7/1958 | Houdart .................... 296/26.13 |
| 3,070,850 A | | 1/1963 | McClure, Sr. |
| 3,462,772 A | | 8/1969 | Morrison |
| 3,738,502 A | | 6/1973 | Noller |
| 3,882,558 A | | 5/1975 | Christensen |
| 4,087,069 A | | 5/1978 | Hall et al. |
| 4,130,069 A | | 12/1978 | Evans et al. |
| 4,222,543 A | | 9/1980 | Gedig et al. |
| 4,277,919 A | | 7/1981 | Artweger et al. |
| 4,489,449 A | | 12/1984 | Failor et al. |
| 4,515,087 A | | 5/1985 | Kurrasch |
| 4,570,547 A | | 2/1986 | Colby |
| 4,577,821 A | | 3/1986 | Edmo et al. |
| 4,651,652 A | | 3/1987 | Wyckoff |
| 4,667,605 A | | 5/1987 | Bastian |
| 4,797,831 A | | 1/1989 | Dressing et al. |
| 4,880,285 A | | 11/1989 | Brinkers |
| 4,913,458 A | | 4/1990 | Hamilton |
| 4,969,403 A | | 11/1990 | Schwartz et al. |
| 4,981,085 A | | 1/1991 | Watt |

(List continued on next page.)

FOREIGN PATENT DOCUMENTS

CH             663 586         12/1987

OTHER PUBLICATIONS

Copy of International Search Report for Corresponding International Application, dated May 15, 2000 for PCT/US99/30289.

Primary Examiner—Joseph D. Pape
Assistant Examiner—Hilary Gutman
(74) Attorney, Agent, or Firm—Baker & Daniels

(57) ABSTRACT

A slide out room is extended from a mobile living quarters to provide auxiliary space and is retracted into the mobile living quarters by a pair of independent actuators. A control is provided which responds to signals generated by position sensors for each actuator to interpret a corresponding actuator whenever the position of one of the actuators exceeds the position of the other actuator by more than a predetermined offset. The actuators are stopped whenever they attain a corresponding IN or an OUT stop limit. The stop limits are set by independently advancing the actuators after they have attained a default limit to set the out and in stop limits independently between the actuators. The offset can be set as the difference between the IN stop limits of the actuators, or can be set by advancing the slide out room away from a fully retracted position a small distance, then independently controlling the actuators until the slide out room achieves a desired orientation with respect to the main living quarters, and then setting the offset equal to the difference of the readings of the position sensors when the slide out room is in the desired orientation.

52 Claims, 34 Drawing Sheets

U.S. PATENT DOCUMENTS

| | | |
|---|---|---|
| 5,088,421 A | 2/1992 | Beckstead |
| 5,237,782 A | 8/1993 | Cooper |
| 5,282,593 A | 2/1994 | Fast |
| 5,285,992 A | 2/1994 | Brown |
| 5,295,430 A | 3/1994 | Dewald, Jr. et al. |
| 5,320,047 A | 6/1994 | Deurloo et al. |
| 5,516,182 A * | 5/1996 | Aragon et al. .............. 296/100 |
| 5,549,053 A | 8/1996 | Grout |
| 5,553,550 A | 9/1996 | Doyle |
| 5,560,444 A | 10/1996 | Tiedge |
| 5,577,351 A * | 11/1996 | Dewald, Jr. et al. ........ 296/171 |
| 5,586,802 A * | 12/1996 | Dewald, Jr. et al. ........ 296/171 |
| 5,601,037 A | 2/1997 | Meyer et al. |
| 5,658,032 A | 8/1997 | Gardner |
| 5,685,510 A | 11/1997 | Frankish |
| 5,758,918 A * | 6/1998 | Schneider et al. .......... 296/175 |
| 5,772,270 A | 6/1998 | Hanser et al. |
| 5,778,803 A | 7/1998 | Machael |
| 5,797,331 A | 8/1998 | Watt |
| 5,800,002 A | 9/1998 | Tiedge et al. |
| 5,809,908 A | 9/1998 | Catta et al. |
| 5,819,669 A | 10/1998 | Eyre |
| 5,826,889 A | 10/1998 | Eden |
| 5,829,822 A * | 11/1998 | Tiedge ....................... 296/175 |
| 5,833,296 A * | 11/1998 | Schneider ................ 296/26.13 |
| 5,845,590 A | 12/1998 | Seidl |
| 5,857,733 A * | 1/1999 | Dewald, Jr. et al. ........ 296/175 |
| 5,902,001 A | 5/1999 | Schneider |
| 5,908,215 A | 6/1999 | Hanser et al. |
| 5,915,774 A * | 6/1999 | Tiedge ....................... 296/175 |
| 5,941,182 A | 8/1999 | Greene |
| 6,050,573 A | 4/2000 | Kunz |

\* cited by examiner

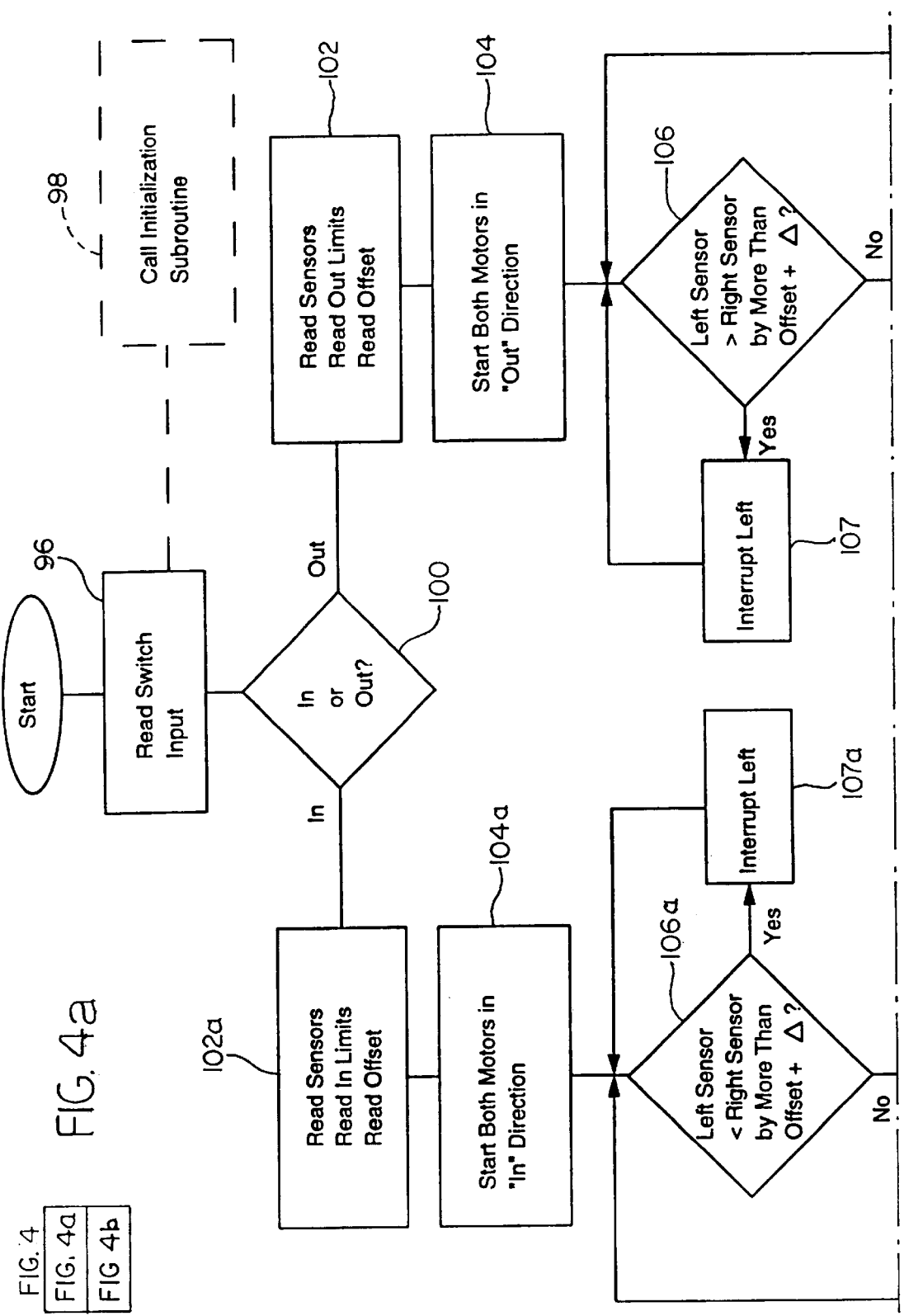

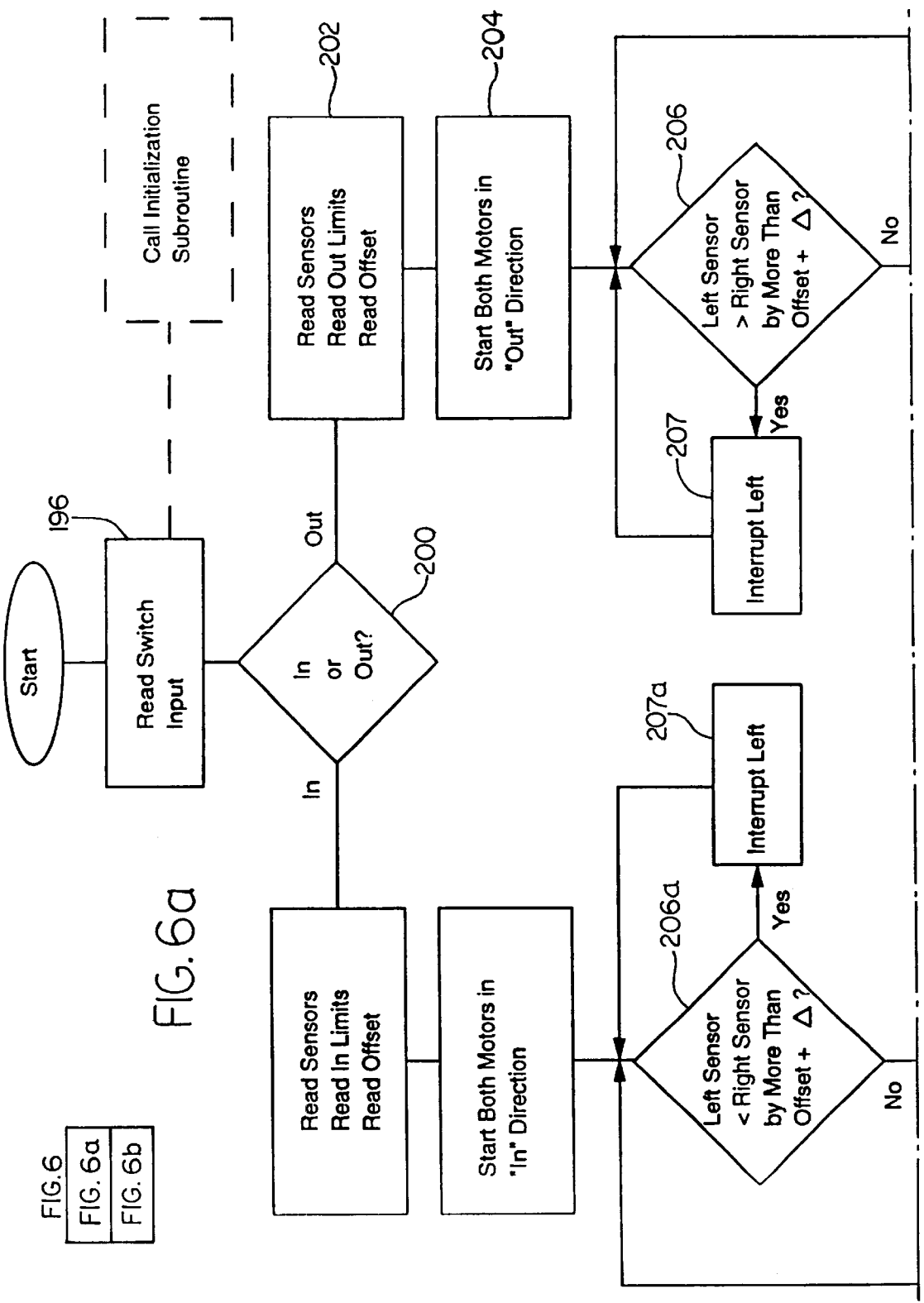

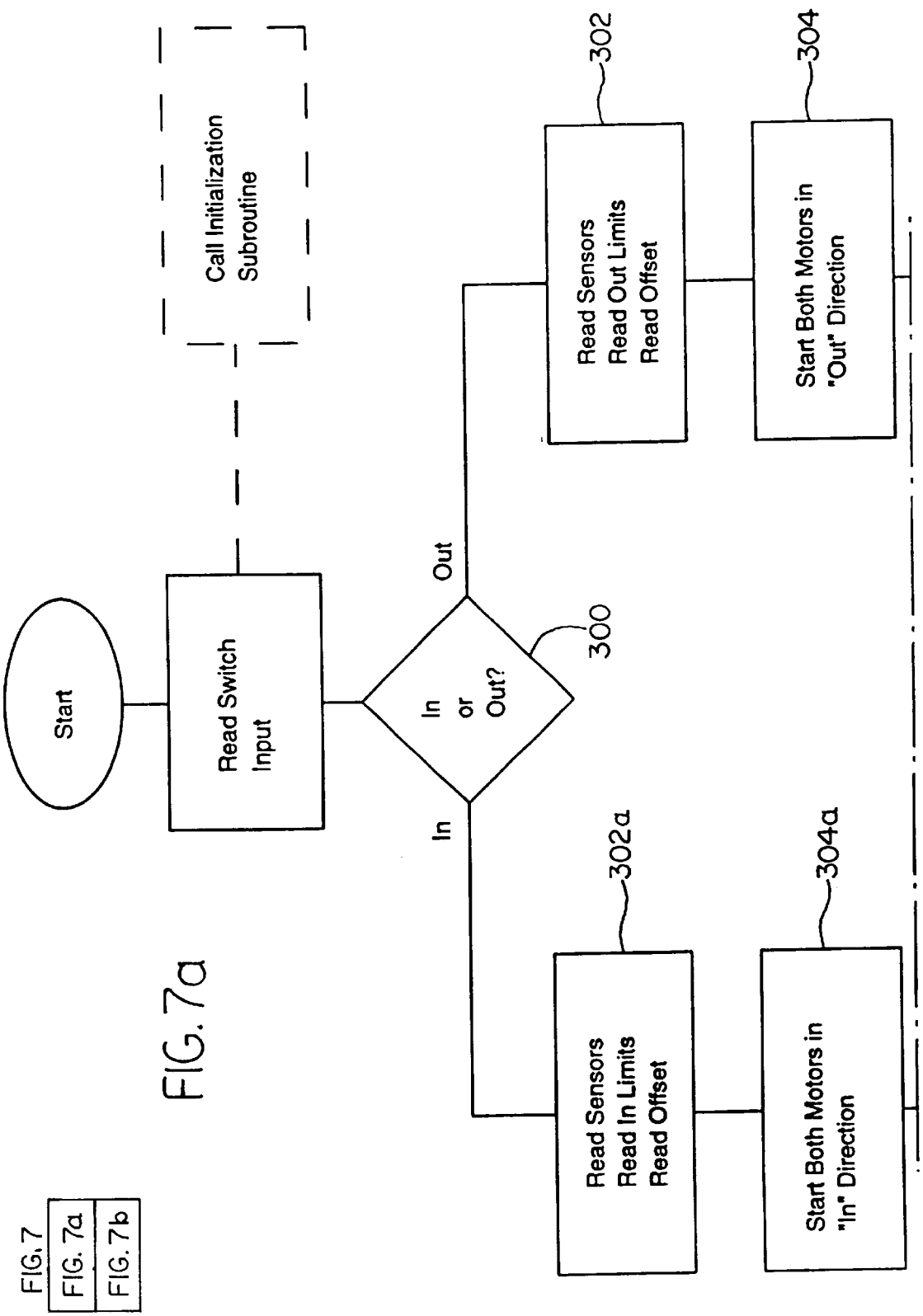

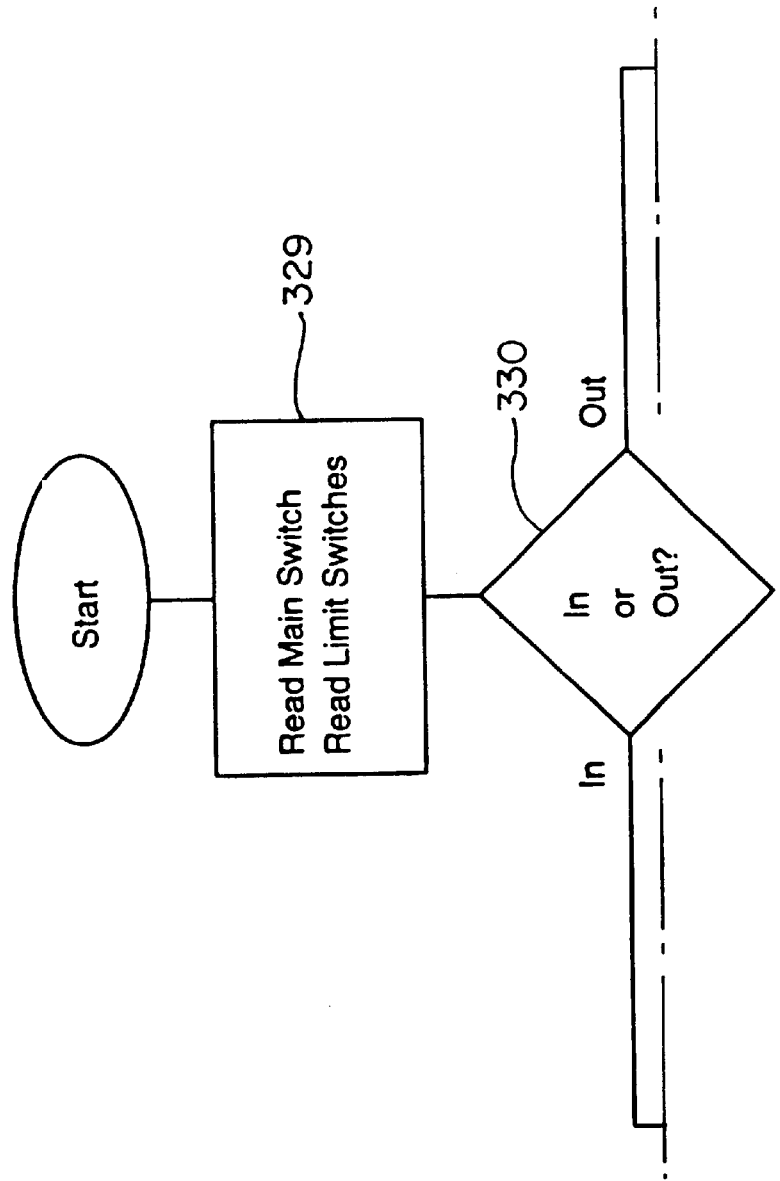

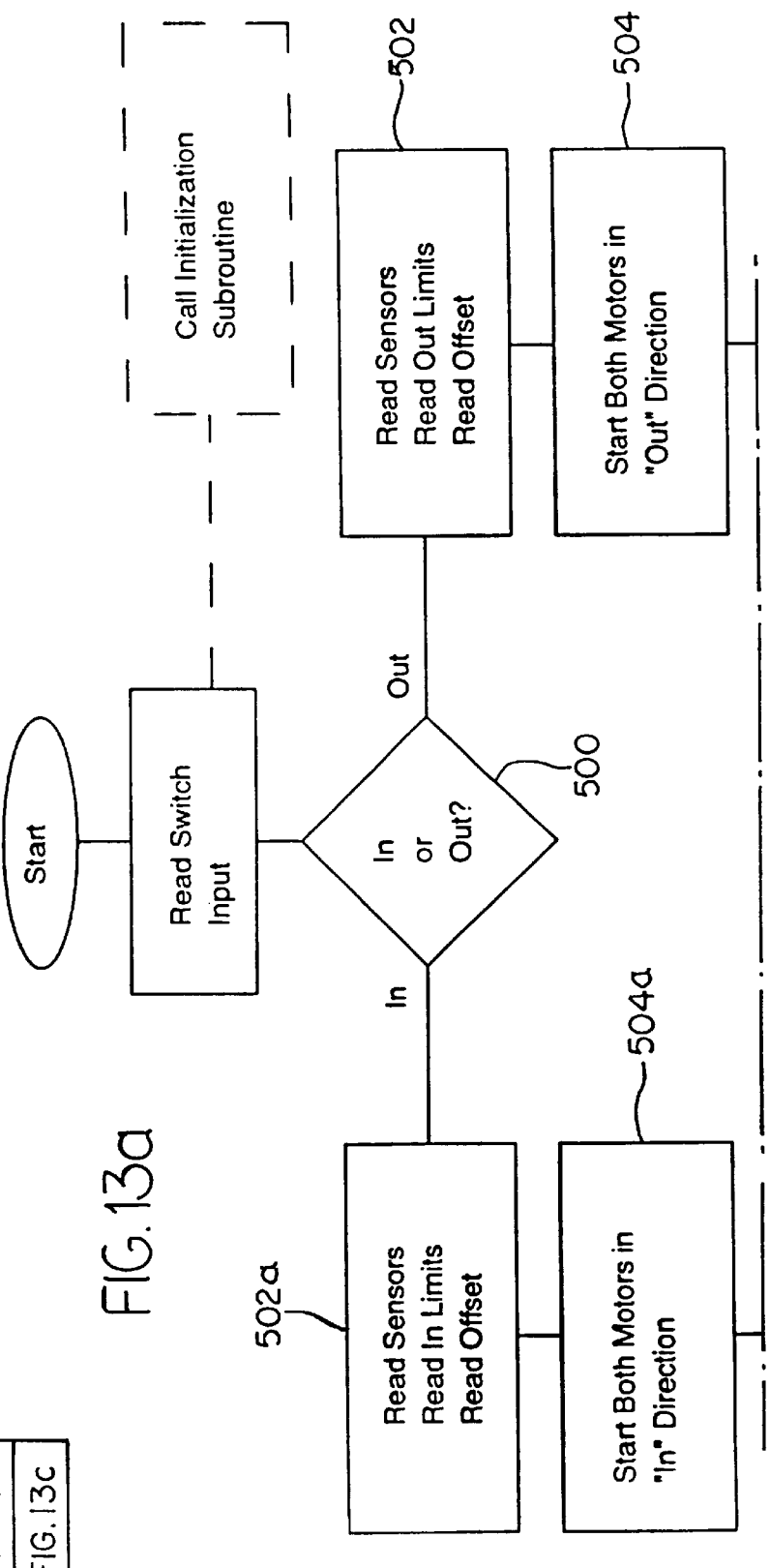

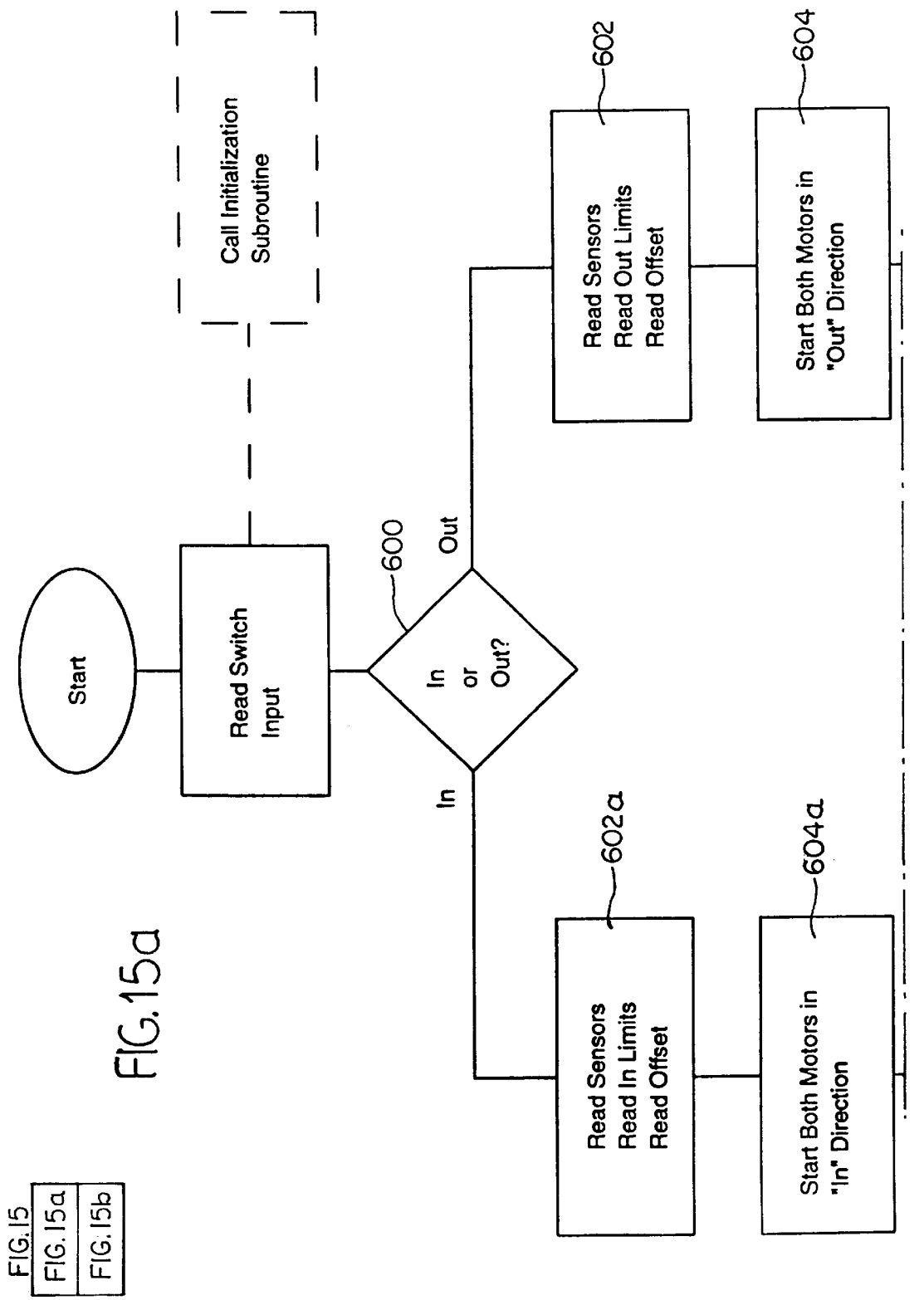

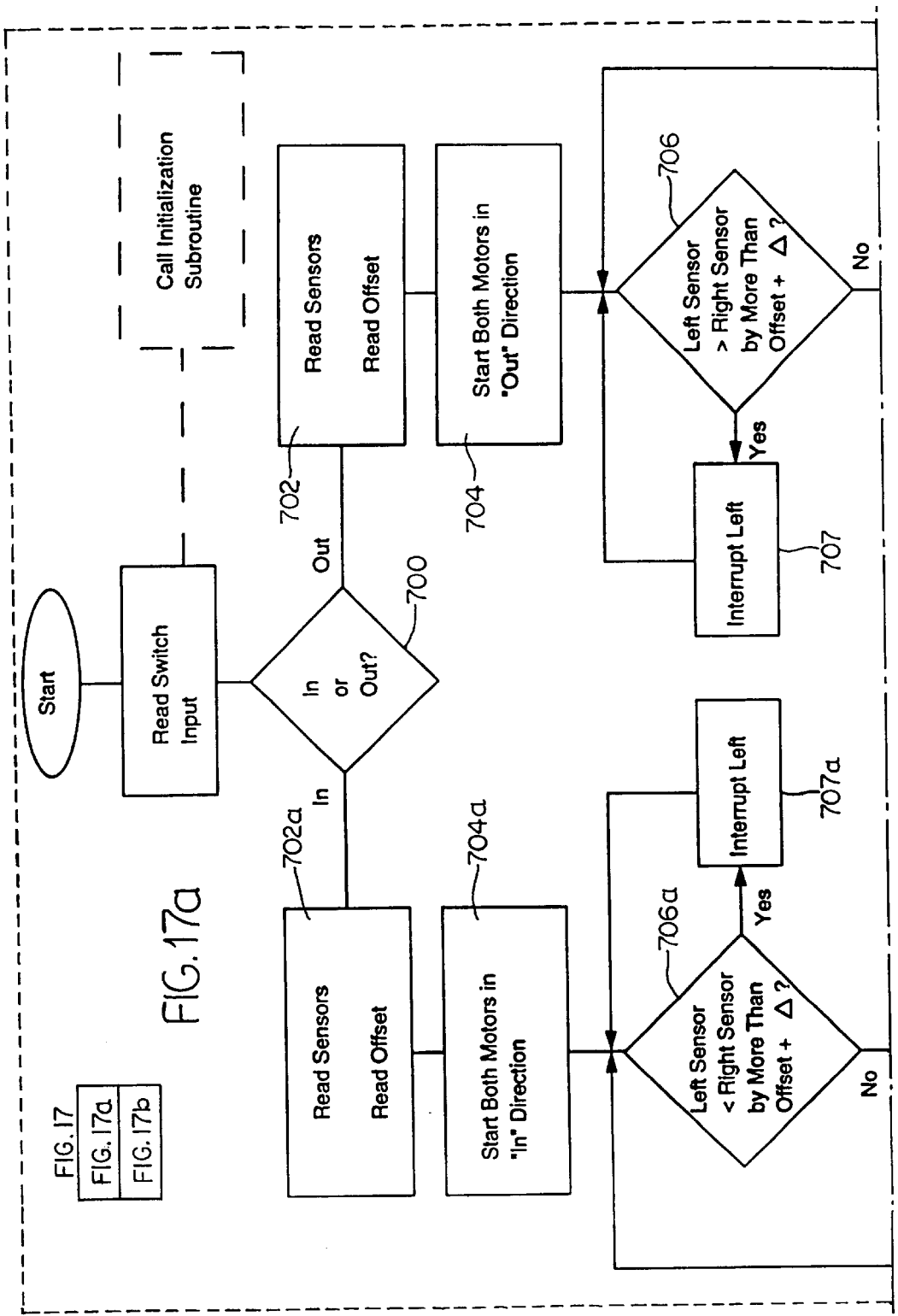

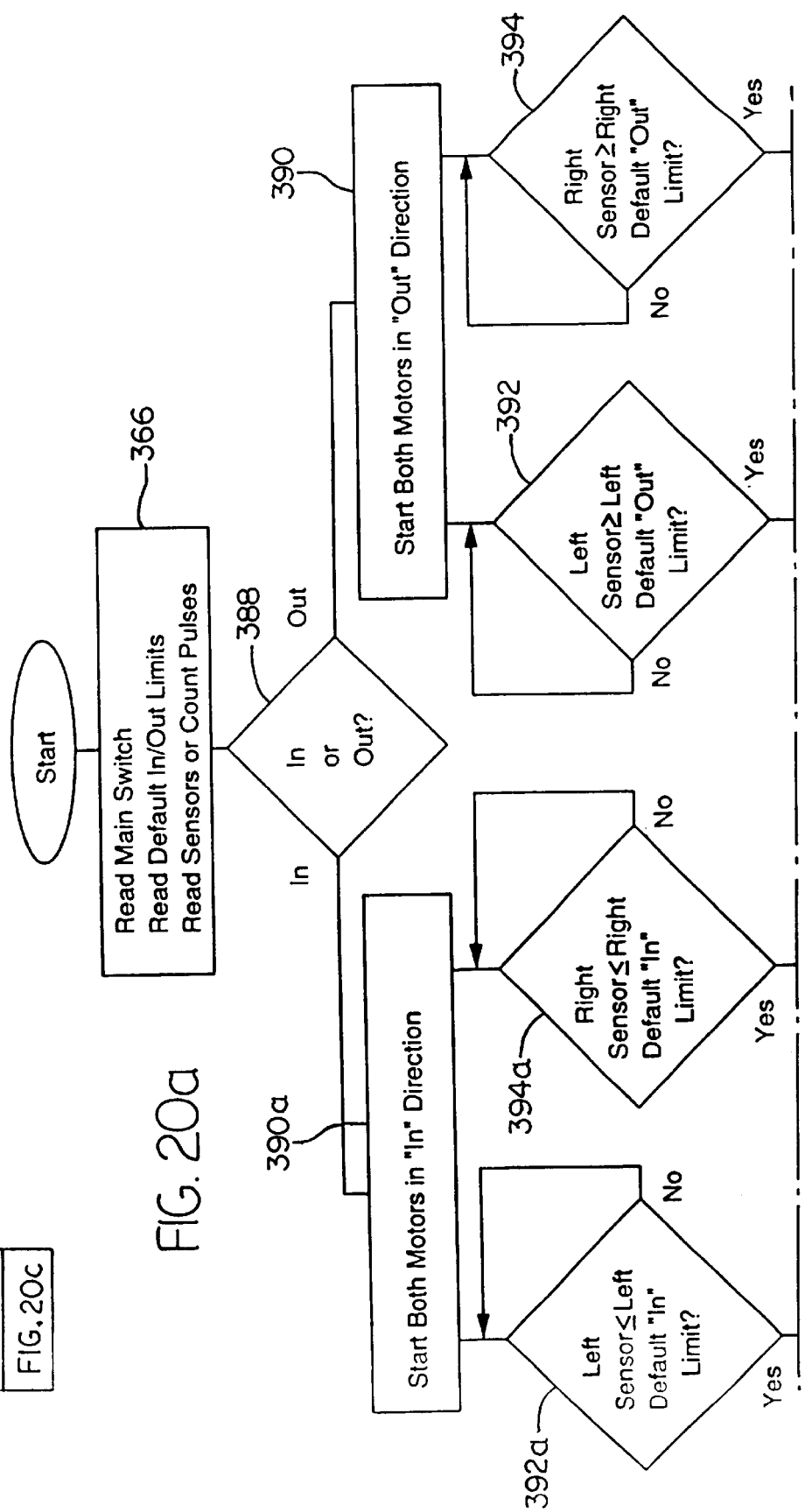

MECHANISM FOR SYNCHRONIZING AND CONTROLLING MULTIPLE ACTUATORS OF A SLIDE OUT ROOM OF MOBILE LIVING QUARTERS

This is a continuation-in-part of U.S. patent application Ser. No. 09/220,165, filed Dec. 23, 1998, now abandoned.

BACKGROUND OF THE INVENTION

1. Field of the Invention

This invention relates to a mechanism for controlling the actuation of a slide out room used on mobile living quarters (such as a recreational vehicle).

2. Discussion of the Prior Art

The width of mobile living quarters, such as recreational vehicles, is limited to that which may be accommodated for travel on the public highways. Accordingly, when the mobile living quarters is parked for use, it is desirable to be able to expand the living quarters, to increase the available living area. So-called slide out rooms have become popular to effect expansion of the available living area of such mobile living quarters. These slide out rooms are retracted into the main living area when the mobile living quarters are transported on the public highways, and then are extended from the main living quarters to provide additional living space when the mobile living quarters is parked for use. Slide out rooms are typically mounted on telescoping tubes which are mounted on the frame supporting the main living area and are actuated by hydraulic rams, electric motors, or similar actuation devices. Typically, two or more such actuation devices are required. Slide out rooms are only semi-rigid. Furthermore, the two or more actuators are often not symmetrically located with respect to the slide out room, because placement of the actuators must accommodate wheel wells and other structural components of the mobile living quarters. It is necessary to synchronize operation of the actuators, and it is desirable to be able to control the "room-out" and "room-in" positions for the actuators to assure that the room is fully extended across its entire length when the room is extended for use, and to assure that it is fully retracted across its entire length when the room is retracted to permit the mobile living quarters to be moved. Failure to fully extend or fully retract the slide out room across its entire length permits gaps to occur between the seals the slide out room to the main living quarters, thus permitting moisture to leak into the unit. Failure to synchronize properly the motion of the actuators may cause undesirable deflection across the length of the room, again resulting in damage, seal problems, and unsightly appearance of the room.

SUMMARY OF THE INVENTION

According to the present invention, a pair of electric motor actuators drive an acmethreaded threaded jack screw, or a rack-and-pinion drive, etc., connected to the slide out room to effect extension and retraction of the slide out room relative to the main living quarters. Although the invention is described in connection with a pair of electric motor actuators, it is apparent to those skilled in the art that the invention is equally applicable to systems having three or more electric motor actuators. Larger slide out rooms may require more than two electric motor actuators to effect extension and retraction of the slide out room. According to the invention, a position sensor, which may be a resistive strip secured to the actuators, or a rotary potentiometer turned by momentum of the actuators, provides a signal representative of the absolute position of the room. Optionally, a pulse generating encoder generates pulses in response to the operation of the actuators to provide an indication of movement of the actuators relative to one another. The pulses are counted to indicate the relative position of each actuator. Stop limits may be established as hereinafter provided to control the "IN" and "OUT" positions of the slide out room.

According to another feature of the invention, operation of the actuators is synchronized so that the back wall of the slide out room remains substantially parallel to the wall of the mobile living quarters for most of the outward and inward travel of the slide out room. Optionally, when the slide out room reaches a point within, for example, 5% of the inner and outer stop limits, synchronization is removed, and each of the actuators travels independently of the other to the OUT or IN stop limits. Each OUT stop limit and each IN stop limit is set independently to assure that full contact with the necessary seals is made when the room is extended into its fully extended position or retracted into the fully retracted position. An optional initialization procedure is provided to permit the stops to be set individually, so that the stops may be set for each unit, since the deflection of the slide out room and positioning of the seals will vary slightly from unit to unit. According to another feature of the invention, the offset between the actuators, which is maintained by synchronization during extension and retraction of the slide out room, is set independently of the stops, thereby enabling the stops to be set to effect proper sealing.

DESCRIPTION OF THE DRAWINGS

These and other advantages of the present invention will become apparent from the following description, with reference to the accompanying drawings, in which:

FIGS. 4a and 4b show a flow chart of the controller process controlling the slide out room in accordance with the embodiment of FIG. 3;

FIGS. 6a and 6b show the flow chart of the controller process controlling the slide out room in accordance with the embodiment of FIG. 5;

FIGS. 7a and 7b show the flow chart of an alternate controller process for use with FIG. 5;

FIGS. 9a, 9b, 10, and 11 show a flow chart of alternate termination subroutines for use with FIGS. 7a and 7b;

FIGS. 13a,13b, and 13c show a flow chart of the operation control for use with the embodiment of FIG. 12;

FIGS. 15a and 15b show a flow chart of a control mechanism for use with the embodiment of FIG. 14;

FIGS. 17a and 17b show a flow chart of a control mechanism for use with the embodiment of FIG. 16;

FIGS. 20a, 20b, and 20c show the flow chart of an optional initialization subroutine;

DETAILED DESCRIPTION OF THE PREFERRED EMBODIMENT

Figure 1:
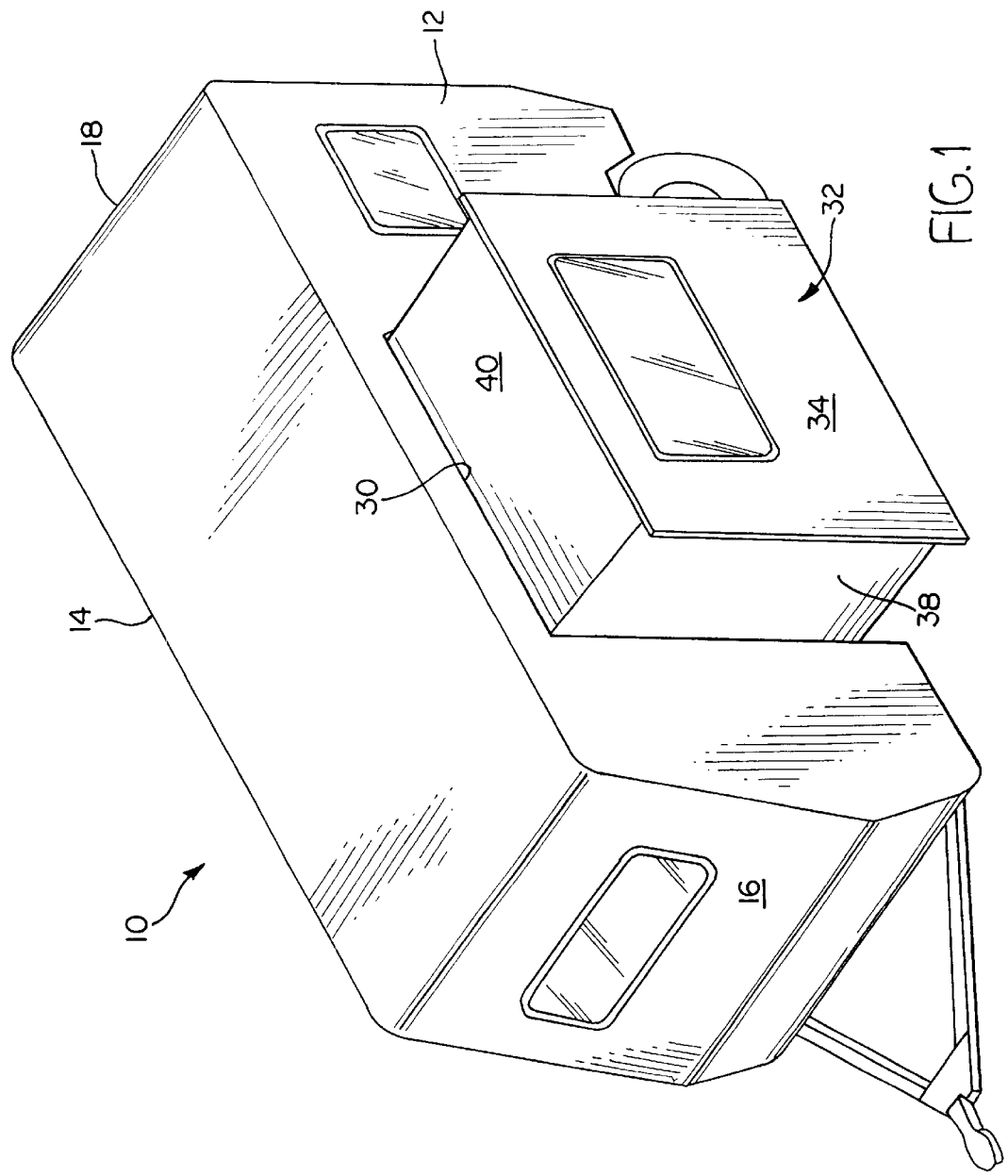
FIG. 1 is a view in perspective of mobile living quarters incorporating a slide out room made pursuant to the teachings of the present invention.
Figure 2:
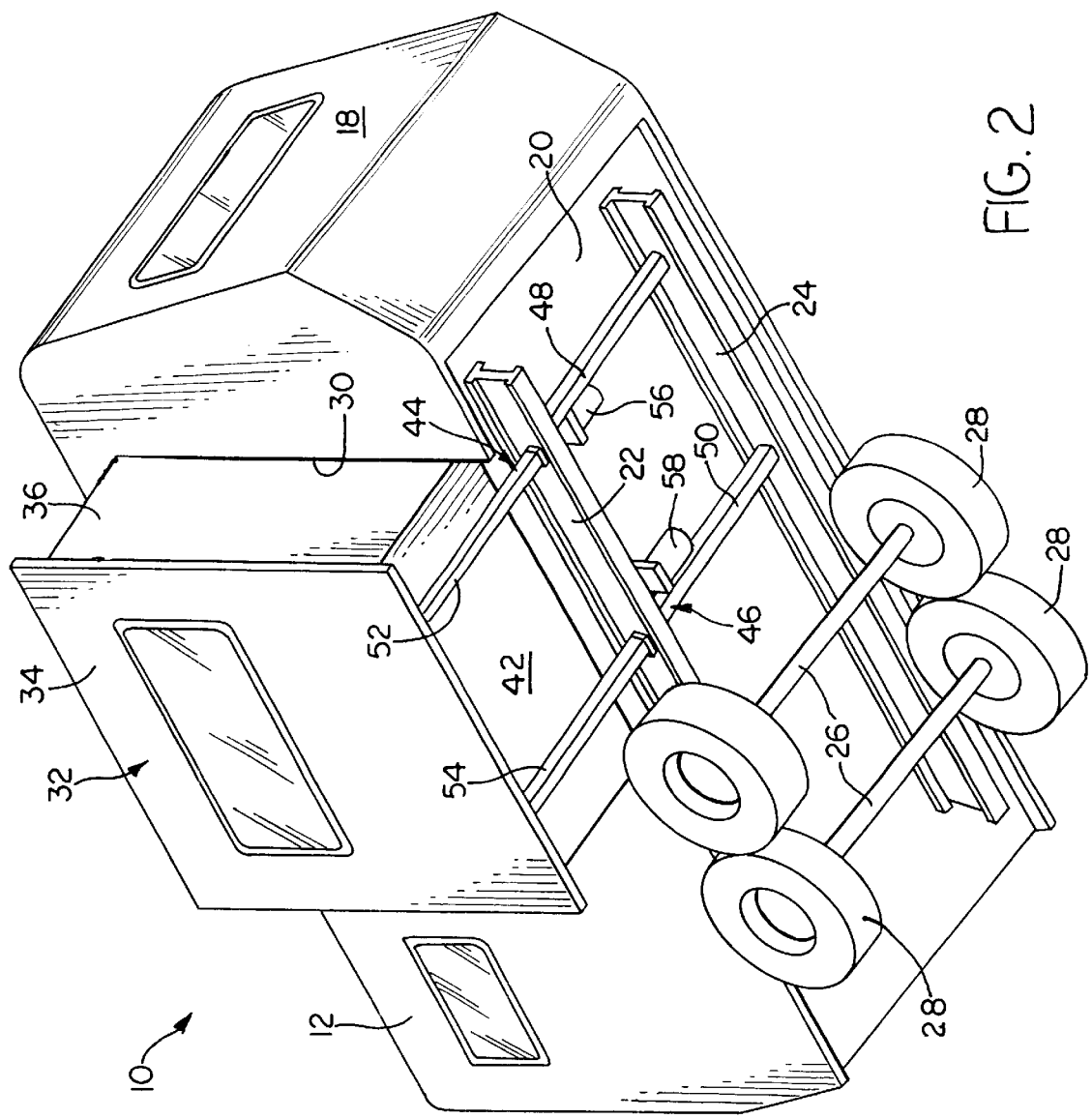
FIG. 2 is a view in perspective of the mobile living quarters illustrated in FIG. 1, but taken from below to illustrate the manner in which the slide out room is supported for movement on the main living quarters and also to illustrate portions of the actuation mechanism.

Referring now to FIGS. 1 and 2, mobile living quarters, such as a recreational vehicle, is generally indicated by the numeral 10 and includes side walls 12, 14, end walls 16, 18, and a floor 20 (FIG. 2), which is supported on a frame consisting of a pair of longitudinally extending main frame members 22, 24. Axles 26 are mounted on the frame members 22, 24 via conventional suspension apparatus (not shown) and support wheels 28 to thereby permit movement of the mobile living quarters 10.

Wall 12 of mobile living quarters 10 includes a large aperture 30 which slidably receives a slide out room generally indicated by the numeral 32, which is slidably mounted for movement relative to the wall 12 from an extended position illustrated in FIGS. 1 and 2 of the drawings, in which the slide out room 32 is extended to provide auxiliary living space, to a retracted position retracted within mobile living quarters 10 to permit the mobile living quarters 10 to be moved on public roads. The slide out room 32 includes a back wall 34 which, when the slide out room is retracted within the main living quarters, is substantially flush with the wall 12. Slide out room 32 also includes side walls 36, 38, ceiling 40, and floor 42, it being noted that the lower portion of the back wall 34 extends below the bottom side of the floor 42.

The slide out room 32 is guided for movement between the extended and retracted positions by a pair of extensible tubular members 44, 46. Each of the members 44, 46 includes an outer tubular member 48, 50 which is secured to the frame members 22, 24, and extends through openings formed therein. The outer tubular members slidably receive a corresponding inner tubular member 52, 54, each of which is secured to the portion of the outer wall 32 extending beneath the lower surface of the floor 42 as described above. The slide out room 32 is moved between the extended and retracted positions by electric motor drives including a pair of electric actuator motors 56, 58. Optionally, hydraulic actuators well known in the art may be used instead of the electric motors 56, 58, the hydraulic actuators being controlled by opening and closing valves controlling communication of hydraulic fluid to the actuators. While the specific embodiment is shown below the floor, it should be appreciated that this invention is also usable either in the floor or above the floor.

Figure 3:
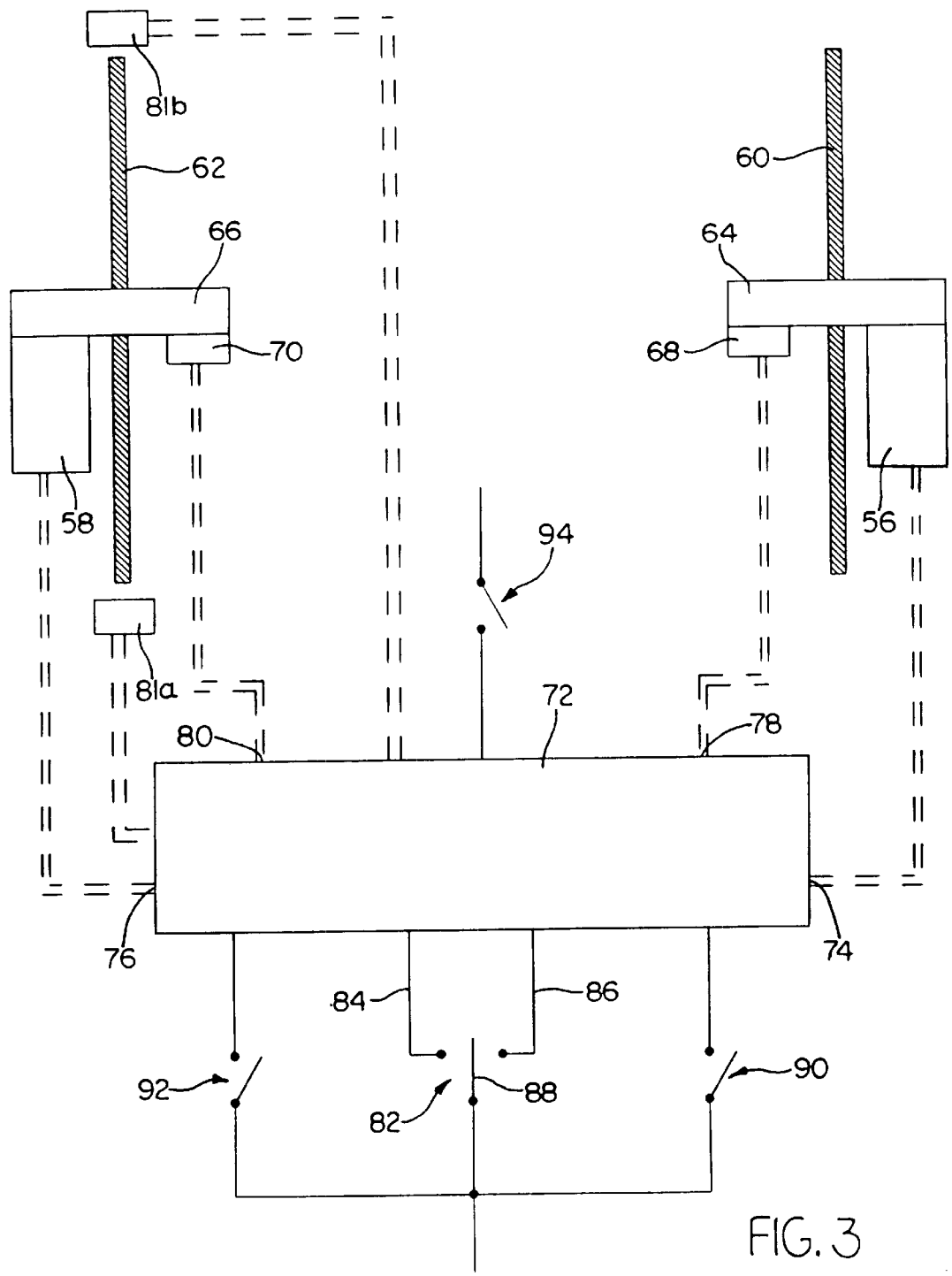
FIG. 3 is a schematic illustration of the actuation and control system used to operate the slide out room illustrated in the preferred embodiment of the invention.

With respect now to FIG. 3, the first embodiment of the control mechanism will be shown which is designed as, and will be referred to as, a Master/Slave version having two actuator motors 56 and 58, each being controlled by position sensors 68, 70. Motors 56, 58 are reversible motors and turn acme-threaded jack screws 60, 62 through their corresponding gear boxes 64, 66. The jack screws 60, 62 are not illustrated in FIG. 2, but preferably extend through inner tubular members 52 and 54 to provide actuation of the slide out room 32. It should be appreciated that the jack screws 60, 62 mesh with fixed threaded members attached to the slide out room 32, whereby rotation of the jack screw moves the slide out room-in and out. Alternatively, a rack-and-pinion drive may be used.

With respect still to FIG. 3, each of the gear boxes 64, 66 is equipped with position sensors 68, 70 which generate signals representing the absolute position of the jack screws 60, 62. The position sensors 68, 70 may be linear encoders comprising a resistive strip that provides increased (or decreased) resistance depending on the distance that the slide out room 32 extends. Alternatively, rotary potentiometers turned by the jack screws, or rotary potentiometers turned by a cable attached to inner tubular members 52, 54, or a rack-and-pinion system connected to the floor and then connected to a potentiometer, may be used. Accordingly, a signal representing the absolute position of the actuator with respect to the fully retracted position is provided. Optionally, the position sensors 68, 70 may be rotary-type encoders that generate pulses proportional to the turning of the jack screw 60 or 62, or rotary encoders turned by a cable attached to inner tubular member 52, 54, or linear encoders that generate pulses responsive to extension and retraction of the actuators, or a rack-and-pinion system connected to the floor and then connected to an encoder, may be used. The pulses are counted to generate a signal indicative of the relative position of the jack screws 60, 62. Both types of encoders or sensors are well known to those skilled in the art. The output of the sensors/encoders is fed to a control mechanism generally indicated by the numeral 72, which also controls the motors 56, 58.

The control mechanism 72 includes an output terminal 74 connected to right-hand motor 56, an output terminal 76 connected to left-hand motor 58, and terminals 78, 80, which receive signals from the position sensors 68, 70, respectively. This embodiment will be referred to as a Master/Slave version, as this embodiment has stop mechanisms, referred to diagrammatically in FIG. 3 as 81a, 81b, whereas the opposite motor has no such stop mechanisms, but rather is a slave to the master. FIG. 3 shows the stop mechanisms as an IN stop mechanism at 81a, and an OUT stop mechanism at 81b. While the stop mechanisms are shown diagrammatically as physically located adjacent to the jack screw 62, it should be appreciated that they could be located anywhere, or could be located within the control mechanism 72, receiving a physical location signal from the position sensors 68, 70. Alternatively, the stop mechanisms could be mechanical limit switches, receiving their input from the movement of the room 32 and/or from the screw 62, with output to the control mechanism 72. Furthermore, they could be over current sensors which stop the motors upon an over current draw. In any event, the IN stop mechanism 81a and OUT stop mechanism 81b cooperate with the embodiment to stop the motors, or otherwise the movement of the room, to prevent further inward or outward movement.

A main control switch generally indicated by the numeral 82 is a three-position switch, with a pair of output terminals, one of which is connected to IN terminal 84 of control mechanism 72, and the other being connected to the OUT terminal 86. When the switch arm 88 is moved to engage the IN terminal 84, the motors 56, 58 are actuated, as will be hereinafter explained, to retract the slide out room into the mobile living quarters. When the switch arm 88 is moved into engagement with terminal 86, the motors 56, 58 are energized in a direction extending the slide out room from the mobile living quarters. When the switch arm 88 is in the neutral position illustrated, both of the motors 56, 58 are turned off.

The switch 82 is preferably a momentary contact switch in which the user must maintain the switch arm in engagement with the corresponding terminals. When the switch arm 88 is released, the switch arm 88 immediately returns to the off position illustrated. Alternatively, the switch 82 may be a maintained contact switch, such that when the switch arm 88 is engaged with either of the terminals 84 or 86, the slide out room extends or retracts until the aforementioned stop mechanisms 81*a*, 81*b* are engaged. Preferably, the switch 82 is mounted on the wall of the mobile living quarters adjacent the slide out room and includes a switch plate covered by a switch cover (not shown). Concealed beneath the switch cover (not shown), or in any other appropriate place where they are concealed from the owner during normal use but are readily accessible to a serviceman, are a right motor override switch generally indicated by the numeral 90, and a left motor override switch generally indicated by the numeral 92. When the switch 90 is operated and the switch 82 is moved to either the IN or the OUT position, the right motor 56, but only the right motor 56, is toggled, in either the IN or the OUT direction, depending upon the position of the switch arm 88. Similarly, the left motor override switch 92 toggles the left motor 58 in either the IN or the OUT direction, again depending upon the position of the switch arm 88. Accordingly, to toggle either of the motors 56 or 58 individually, the serviceman must operate both the switches 82 and 90 or 82 and 92 at the same time. Also similarly concealed beneath the switch cover is a momentary contact set switch generally indicated by the numeral 94. The set switch 94 is operated to set limits and for other purposes as will be described in detail hereinafter.

Figure 4B:
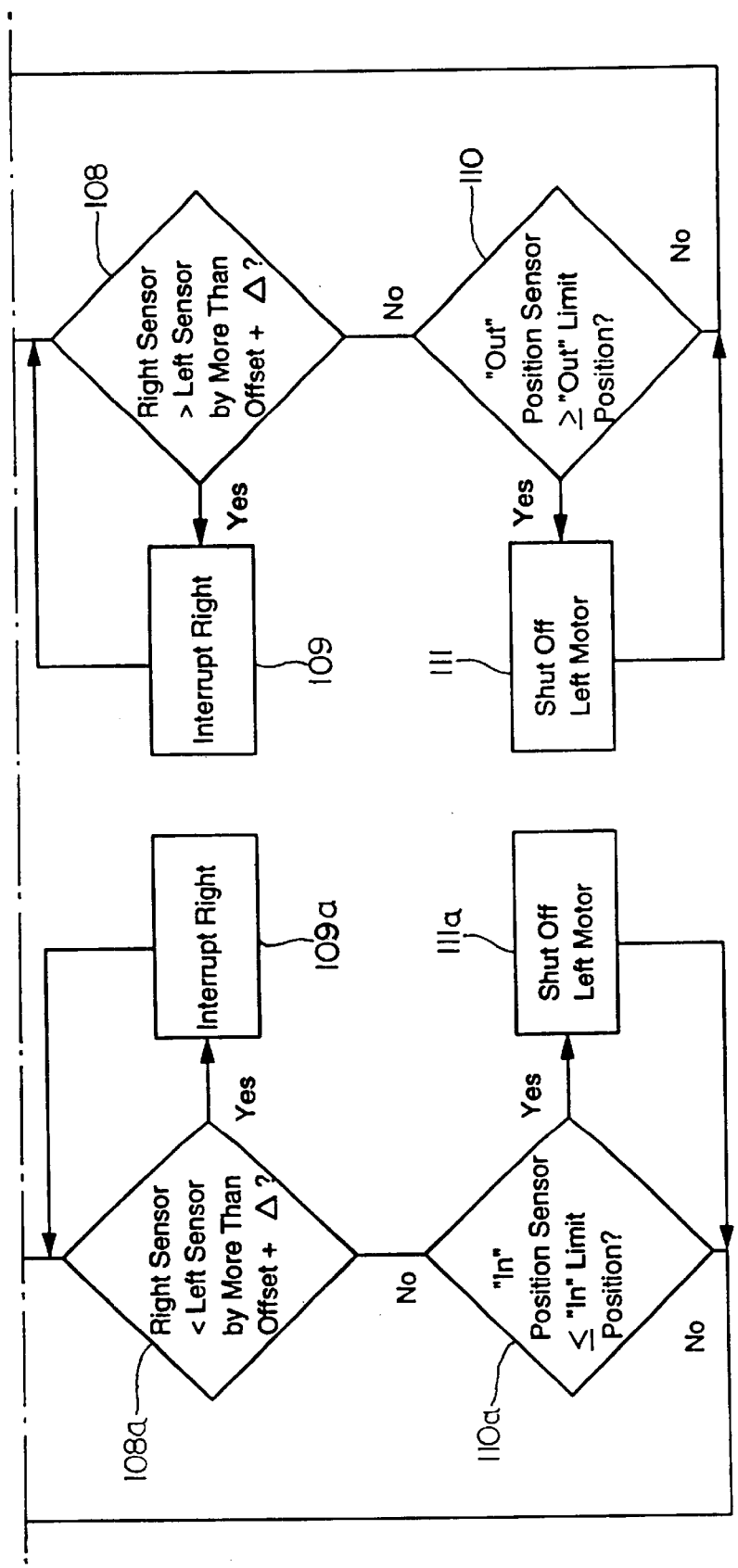

Referring now to FIGS. 3 and 4, operation of the controls for the motors 56, 58 will be explained. The main control is illustrated in FIG. 4, which responds to operation of the switch 82 to read the switch inputs as indicated at 96. If the set switch 94 (FIG. 3) is pushed, an initialization subroutine is called, as indicated at 98. The initialization subroutine will be explained in detail hereinafter.

Various embodiments of a slide out room control program will be described herein. It should be appreciated that the slide out room has fully retracted positions and fully extended positions. These are the extreme positions which are intended to be where the user will place the room, and where the room is in its optimum position, in or out for sealing purposes, and/or alignment. These positions will be referred to as IN limit position or OUT limit position. Other embodiments will be described where the room is intended to move to positions "shy" of the IN limit position or OUT limit position, and be halted there. These shy positions will be referred to as "IN reference positions" and "OUT reference positions."

After started by operation of switch 82, the slide out room control program then proceeds to test at step 100 (FIG. 4) to determine if the switch 82 is in the OUT or IN position. If the switch arm 88 has been moved into OUT terminal 86, the room is to be moved to the extended position. As indicated at 102, the position sensors 68, 70 are read, the outer limit position as measured by OUT stop mechanism 81*b*, which is either set in memory when the unit is manufactured or is set by the initialization subroutine as will hereinafter be explained, is read, and an initial offset between the sensors is read. The position sensors 68, 70 may not have the same "zero" datum, so that the synchronization of the actuators must take into account the initial offset. Similarly, if the pulse type encoders are used, the initial pulse readings may be very different, so that this initial offset is either set when the unit is assembled or is set by the initialization subroutine. As indicated at 104, both motors are started in the OUT direction, and the sensors are tested, as indicated at 106, to maintain the synchronization between the motors 56 and 58. At 106 the left position sensor 70 is tested to see if the left position sensor is greater than or equal to the right position sensor 68, by more than the offset plus a differential. If the left is greater, then the left motor is interrupted, as shown at 107, to allow the right motor to catch up. It should be appreciated herein that the term "interrupted" could be accomplished by many ways; for example, by reduction of power, by variable speed motors, by clutches, and the like. As shown at 108, the same sequencing occurs, but with respect to the right motor, and if necessary, an interrupt at 109 is kicked in to allow the left to catch up. This is the synchronization control process. At 110, the OUT stop mechanism 81*b* is tested to see if the room has moved to a position equal to or beyond the OUT position. If so, the left motor 58 is shut off at 111 by stop mechanism 81*b*. This, however, allows the right motor 56 to continue until it is normally interrupted by the function at 109, where the right motor will progress to a position greater than the left position sensor 70 by more than the offset plus the differential.

It should be obvious after the above description with respect to the movement of the room to the OUT position that, if switch 82 is positioned to move the room in, the appropriate sensors are also read at 102*a* and the motors are started to move in the IN direction at 104*a*. A similar synchronization program is sensed at 106*a* and 108*a* to insure that the left and/or right motor is not moving too quickly relative to the other. If it is, either the left or the right is interrupted as mentioned before at 107*a* or 109*a*, respectively. When the room comes to a position where the IN position sensor is less than or equal to the IN limit position at 110*a*, the stop mechanism 81*a* shuts off the master motor at 111*a*, in this case the left motor. The right motor is allowed to continue to operate until the position sensors 68, 70 interrupt the right motor at 108*a*, where the right sensor is less than the left sensor by more than the offset plus the differential. It should be appreciated from the above, in particular with reference to 106*a* and 108*a*, that the reference to the left sensor relative to the right sensor is "less than" as it is anticipated that the sensors would be in a digital numeral format. Thus the digital numeric value of the closest sensor towards the end position would have a lesser digital value than the one more distant to the end position. If the absolute value of the difference is considered, then the terminology "greater than" should still be continued.

Figure 5:
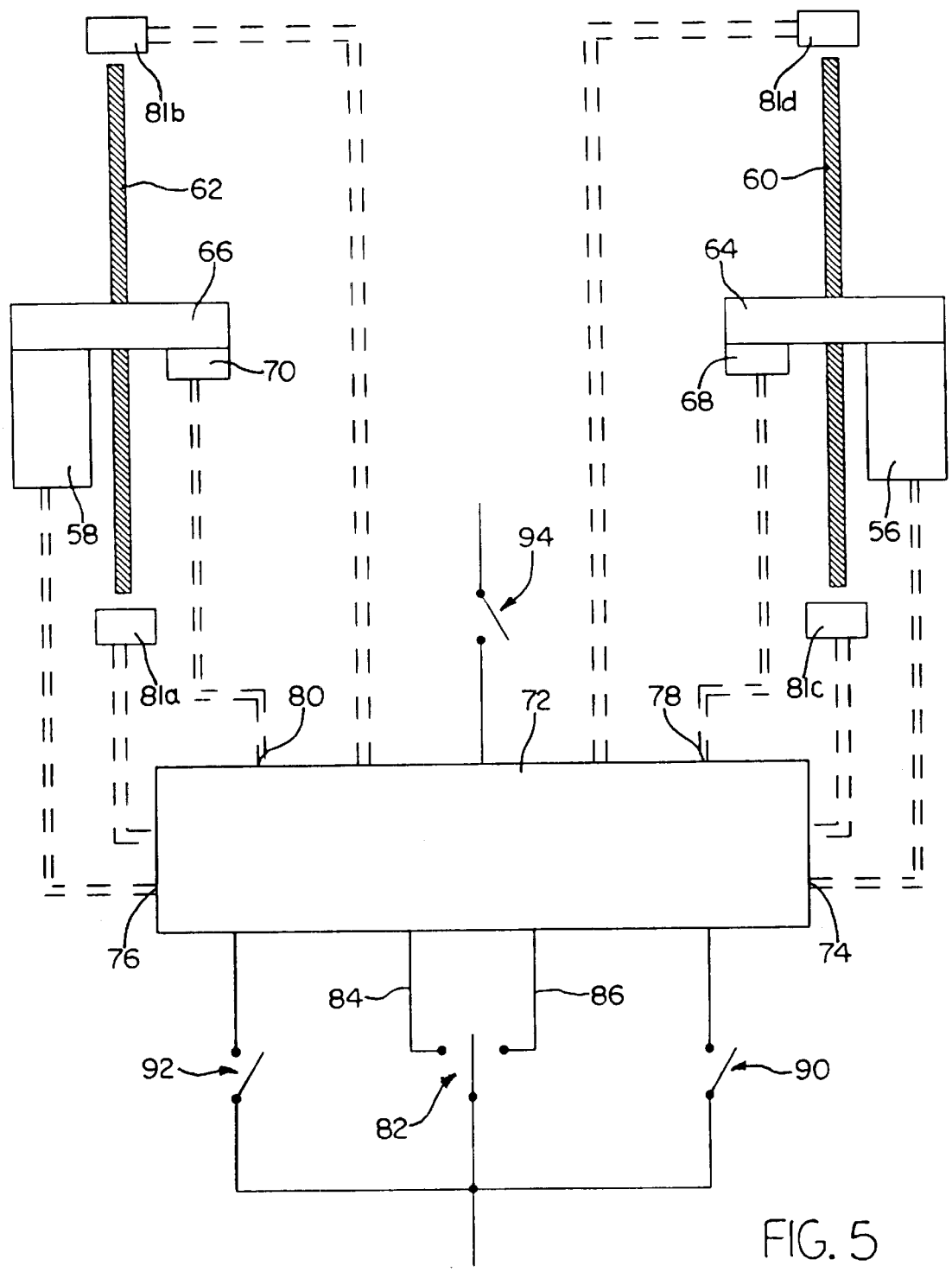
FIG. 5 is a schematic view similar to that of FIG. 3 showing an alternate actuation system.
Figure 6B:
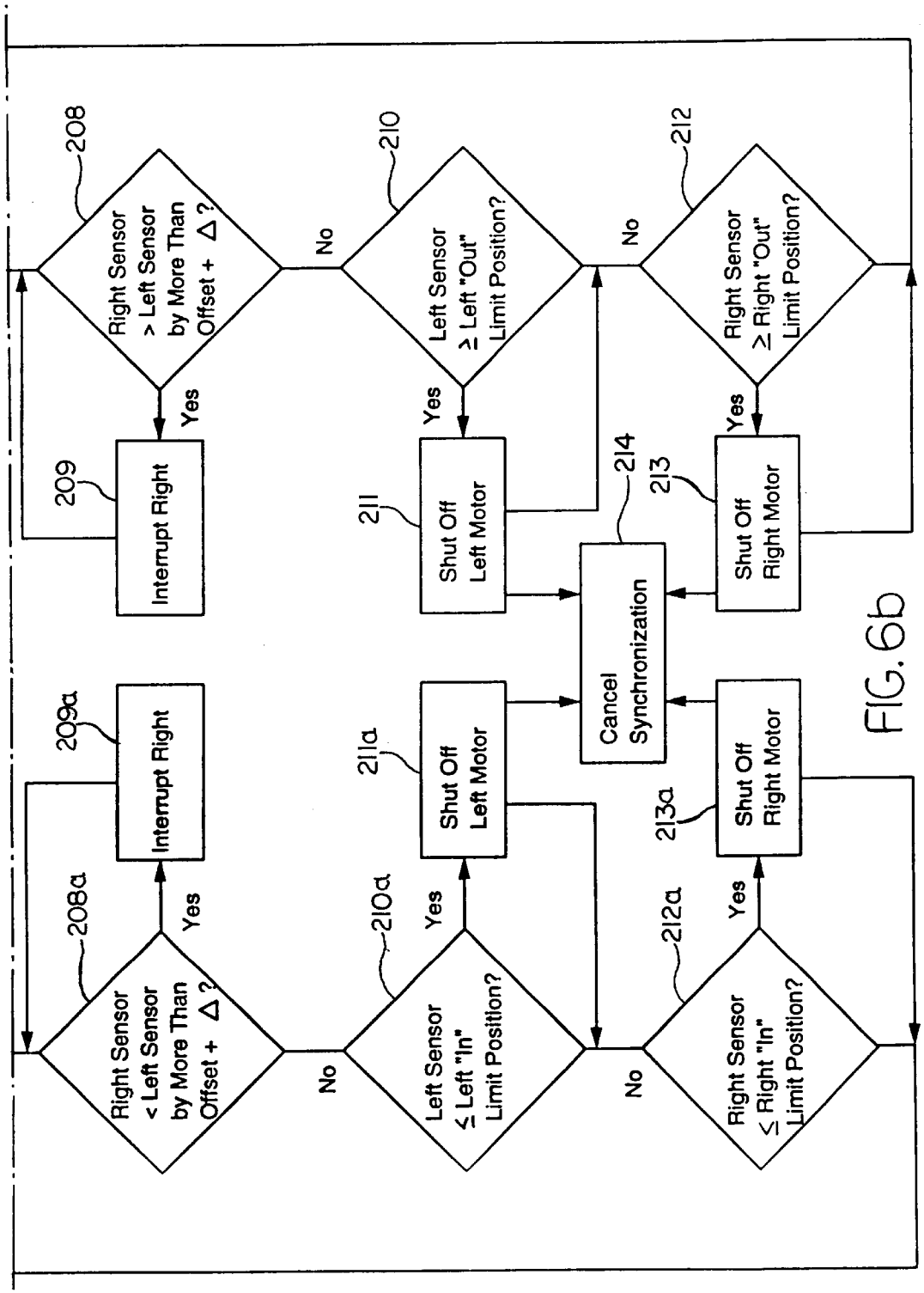

With respect now to FIGS. 5 and 6, a second embodiment of the invention will be shown, which is similar to that of FIG. 3 and 4, but in this case each of the right and left side have corresponding in and out stop mechanisms, that is, 81*a*, 81*b*, 81*c*, and 81*d*, and therefore it is not a Master/Slave system. Otherwise, the system is the same as that depicted in FIG. 3. With reference now to FIG. 6, the operation of reading the switch input at 196, the direction of movement at 200, reading the sensors at 202, starting the motors in the out direction at 204 together with the synchronization process 206, 206*a*, 207, 207*a*, 208, 208*a*, 209, and 209*a*, is directly analogous to the above mentioned embodiment of FIG. 4 as steps 96, 100, 102, 104, 106, 106a, 107, 107a, 108, 108a, 109, and 109a. The difference between the embodiment of FIG. 6 and FIG. 4 is in the stop process, in that the right-hand side has IN and OUT stop mechanisms, 81c–81d. Once again, these IN and OUT stop mechanisms 81a–81d are shown only diagrammatically in FIG. 5 as being located adjacent to the screws 60, 62. These stop mechanisms could be mechanical limit switches, over current sensors, or could simply be a switch associated directly with the control mechanism 72. However, what is incorporated into the embodiment of FIG. 5 is a mechanism to stop the motors 56, 58 when either the sensors 68, 70 indicate the room is at its fully IN or OUT limit position, or the room itself is at its full in or out position, which triggers some type of a stop switch.

With reference still to FIG. 6, the difference in the flow diagram of FIG. 6 and that of FIG. 4 is in the stop mode of the right and left motor. As shown at 210 and 212, the control mechanism 72 senses whether the left sensor is greater than or equal to the left OUT limit position, and whether the right sensor is greater than or equal to the right OUT limit position, respectively. If either the left or right sensor, and resultingly the room 32 is at its out limit at either the right-hand or the left-hand side, the corresponding motor is shut off at 211 or 213 via the OUT stop mechanism 81b or 81d. At this points whichever motor, left or right, has been shut off, will also signal for cancellation of the synchronization at 214. This allows the corresponding right or left motor to continue to its full OUT position, where it is shut off at either 211 or 213. As in the other designs, the slide out room 32 is synchronized while moving in at 206a and 208a, and is stopped at its left and right IN limit positions at 211a and 213a, by sensors at 210a and 212a in a similar manner to the OUT limit positions described above with respect to functions 210 and 212.

With respect now to FIG. 7, another control process of controlling a unit as described by FIG. 5 will be discussed, where the room 32 is stopped at some arbitrary position just before its full IN or OUT limit position. For this discussion, an OUT reference position has been arbitrarily set at 95% of the OUT limit position, and the IN reference position has been arbitrarily set to be or within 5% of the IN limit position, but any variation of the same positions can be incorporated into the operation. This operation will now be described with reference to FIG. 7.

After started by operation of switch 82, the program then proceeds to test at 300 to determine if the switch 82 is in the OUT or IN position. If the switch arm 88 has been moved into contact terminal 86, the room is to be moved to the extended position. As indicated at 302, the sensors are read, the OUT stop limits, which are either set in memory when the unit is manufactured or are set by the initialization subroutine as will hereinafter be explained, are read, and an initial offset between the sensors is read. The position sensors may not have the same "zero" datum, so that the synchronization of the actuators must take into account the initial offset. Similarly, if the pulse-type encoders are used, the initial pulse readings may be very different, so that this initial offset is either set when the unit is assembled or is set by the initialization subroutine. As indicated at 304, both motors are started in the OUT direction, and the position sensors 68, 70 are tested, as indicated at 306, to determine if either of the sensors is reading greater than or equal to 95 percent of the OUT limit position. It is desirable to remove synchronization during approximately the last 5% of travel so that each of the actuators continues to run until it achieves its individual stop limit.

These stop limits may be quite different between the actuators, because the actuators are commonly not positioned symmetrically with respect to the slide out room, because their positions must accommodate obstructions, such as wheels and other underbody components. The deflection of the slide out room is such that, when combined with the asymmetrical positioning of the actuators, different stop limits are required to assure that the slide out room is properly sealed when in the extended position. If either actuator is within 5% of its OUT limit, the termination subroutine is called as at 308. The termination subroutines will be described in detail hereinafter. If the actuators are not within 5% of the OUT limit, the program then proceeds to determine, as indicated at 310, as to whether the left position sensor 68 exceeds the right position sensor 70 by more than the offset plus a relatively small tolerance that is set initially. If the left sensor does exceed the right sensor reading by the offset plus the tolerance, the left motor is interrupted as indicated at 312 to permit the right motor to "catch up" with the left.

The program then proceeds, as indicated at 314, to test as to whether the right position sensor 68 exceeds the left position sensor 70 by more than the offset plus the tolerance. If it does, the right motor is interrupted to permit the left actuator to "catch up," as indicated at 316. If the test at 300 indicates that the room is to be moved in towards the retracted positions, the sensors, limits and offsets are read as indicated at 302a, both motors are started in theIN direction as indicated in 304a, and the tests are made at 306a, 310a and 314a, which correspond to the tests made during outward movement or extension of the retractable room at 306, 310, and 314. The right or left motors are interrupted as indicated at 312a and 316a, to thereby assure that the. actuators are controlled or synchronized to permit movement of the slide out room in a manner such that the back wall of the slide out room remains substantially parallel to the main wall of the mobile living quarters through which the slide out room extends, during both extension and retraction of the slide out room.

Figure 7B:
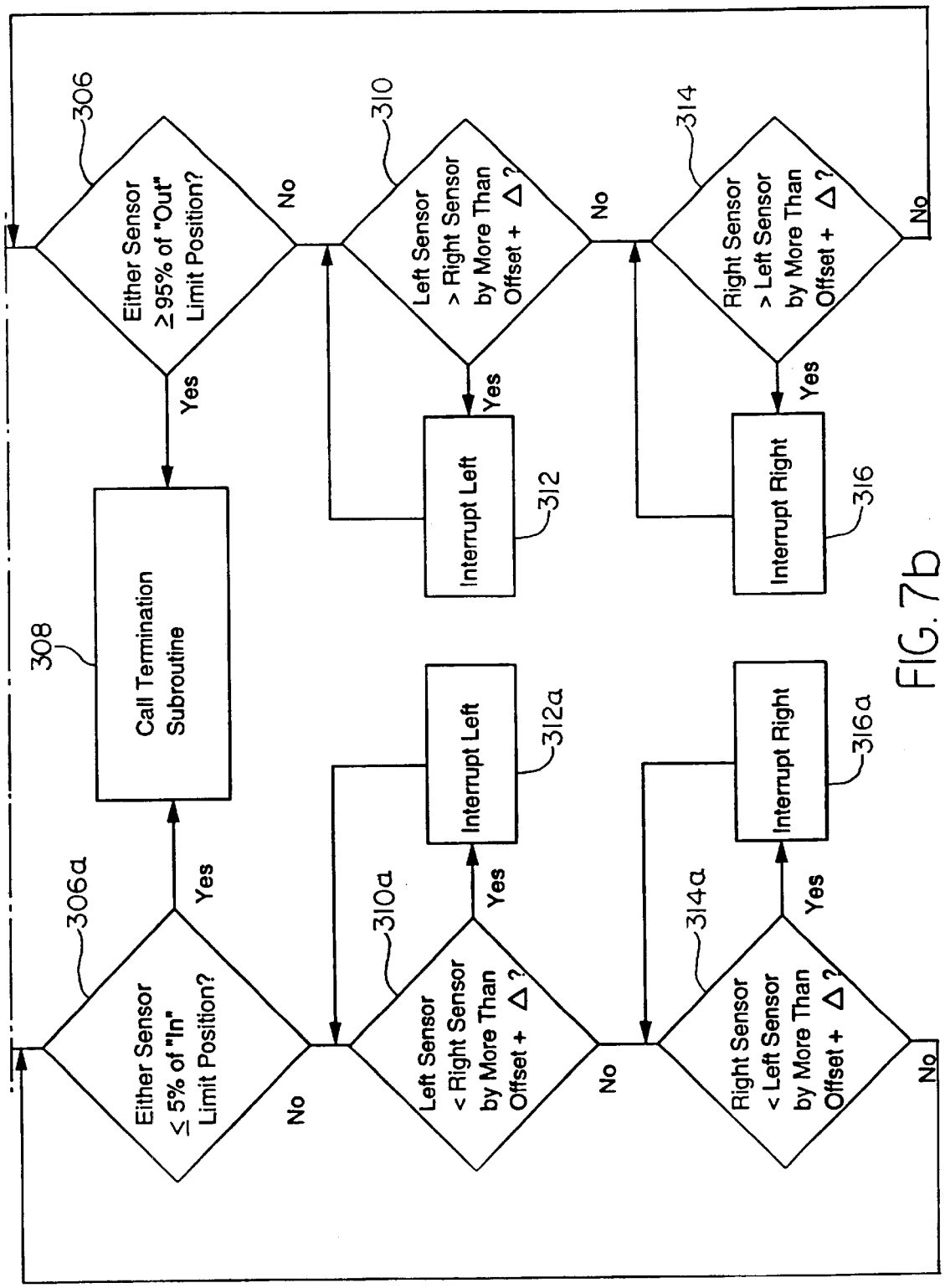
Figure 8A:
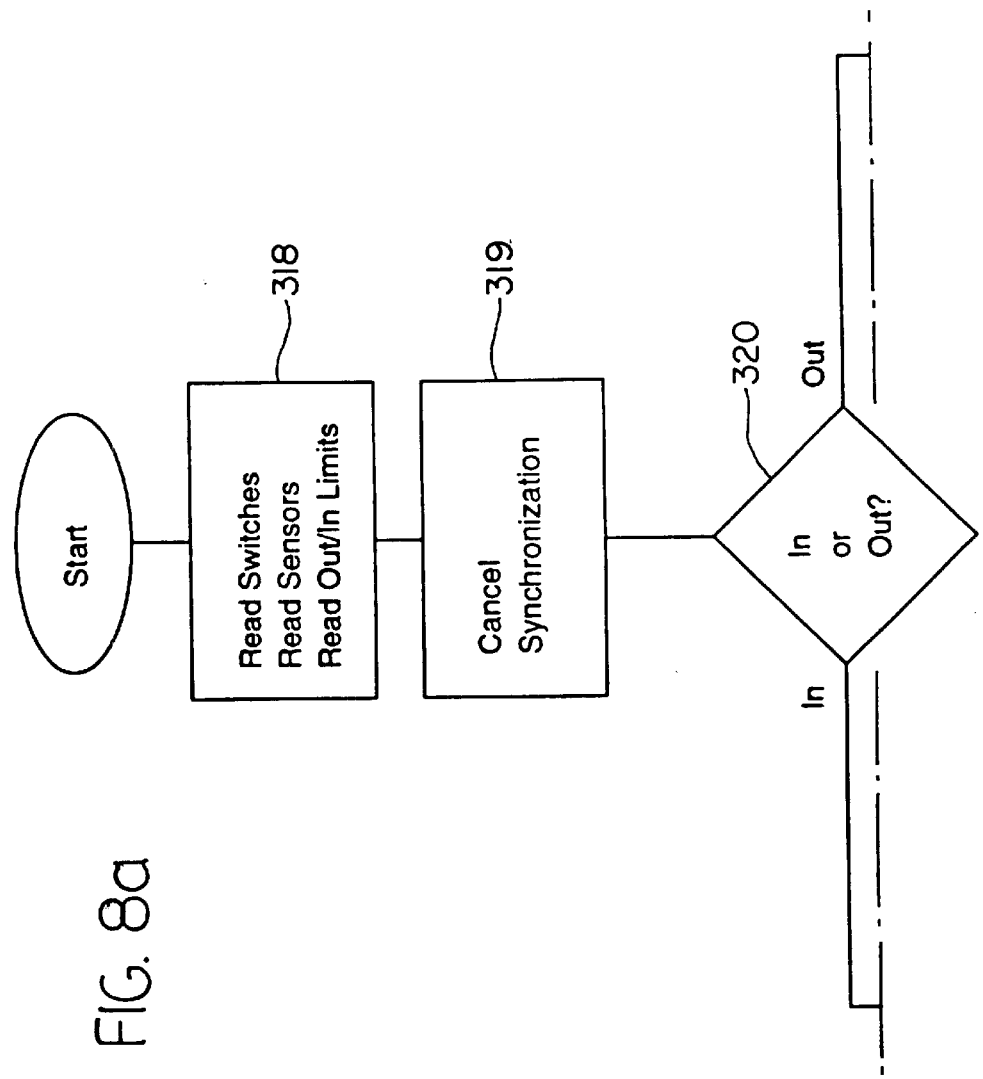
FIGS. 8a and 8b show a flow chart of the termination subroutines for use with FIGS. 7a, end 7b
Figure 8B:
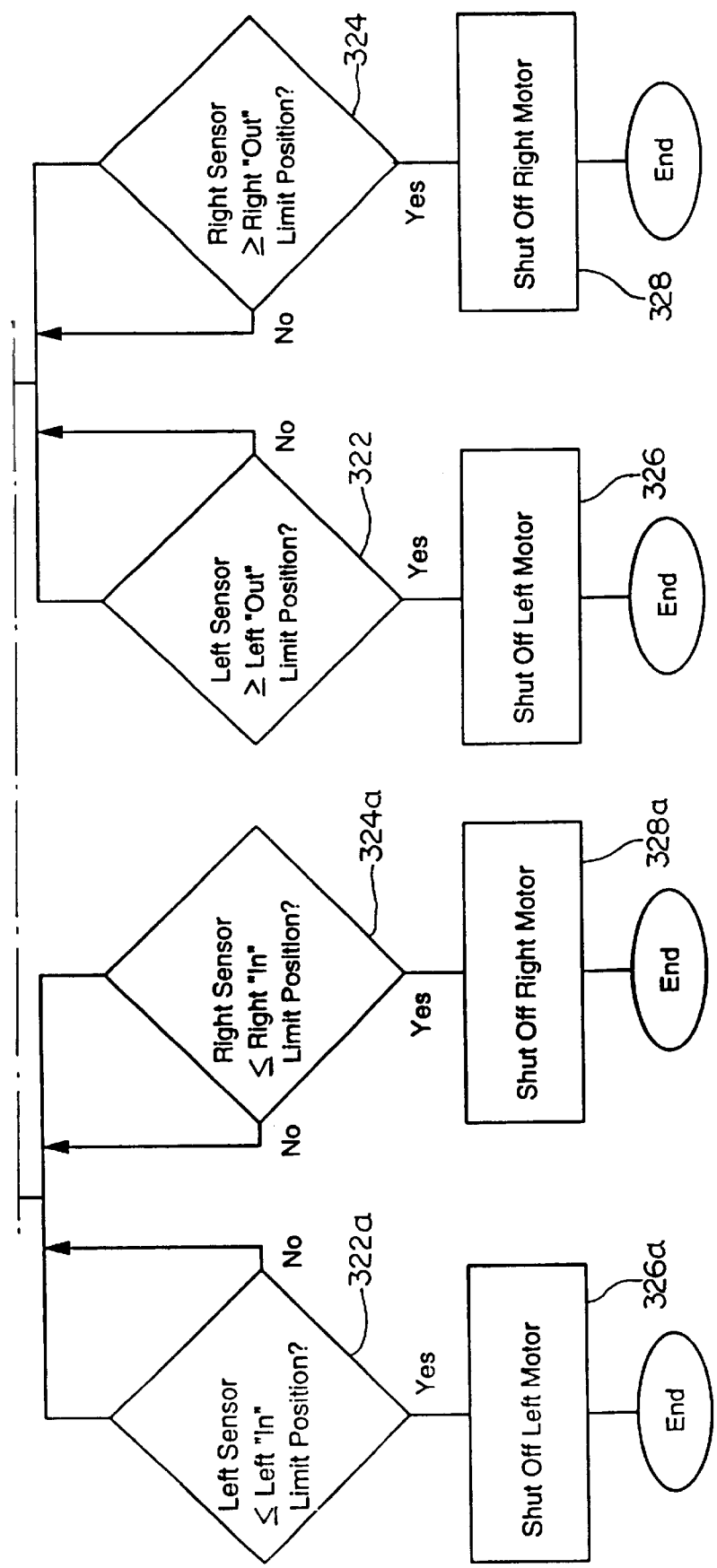

Referring now to the termination subroutine illustrated diagrammatically in FIG. 8, when the subroutine is called at 308 by the main program illustrated in FIG. 7, the switches, sensors and outlin limits are read as indicated at 318, and the synchronization, that is, functions 310, 314, 310a, 314a, are canceled at 319. The switch 82 is then tested as indicated at 320 to determine if the room is being extended or retracted. If the room is being extended, the left sensor is tested to determine if it equals or exceeds the left OUT limit position as indicated at 322, and the right sensor is tested as indicated at 324 to determine if it is equal to or greater than the right OUT limit position. When the limits are achieved, the left and right motors are turned off as indicated at 326 and 328, it being noted that individual OUT limits are set for each motor, which are turned off individually when their OUT limit positions are achieved. Accordingly, the slide out room may be deflected somewhat by continued operation of one of the motors, while the other motor is turned off, such limited deflection being necessary in order to achieve proper sealing and to assure that the slide out room is fully extended over its entire length. Similarly, if the slide out room is being retracted, the left and right sensors are tested against their IN limit positions as indicated at 322a and 324a, and, when the limits are attained, the right and left motors are shut off as indicated at 326a and 328a.

Figure 9B:
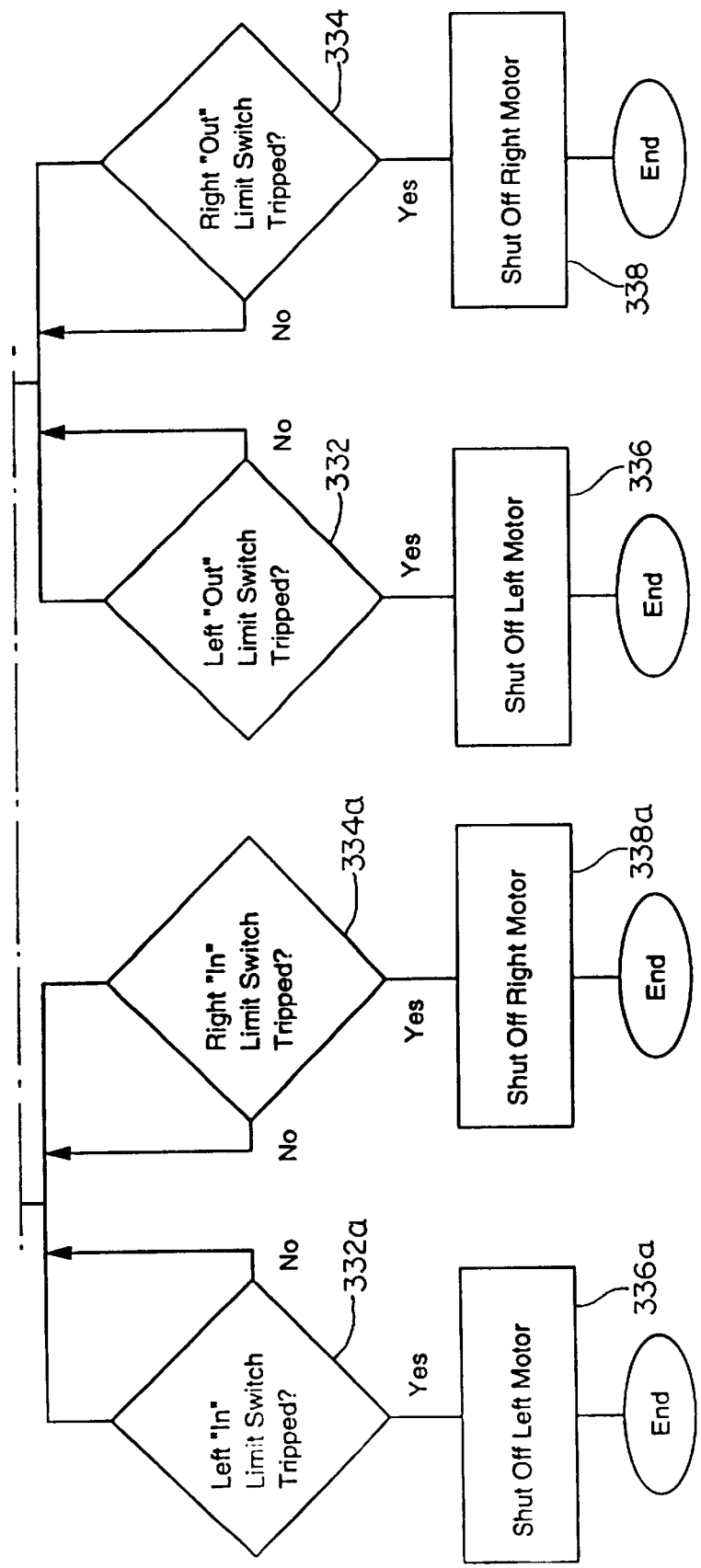

Referring now to FIG. 9, an alternate embodiment of the termination subroutine uses mechanical limit switches to control the extended and retracted positions of the slide out room. These limit switches are mechanical devices, well known to those skilled in the art, and are mounted to be actuated when the fully extended or fully retracted positions of the slide out room are attained. If limit switches are used, the limits used to control termination of synchronization as the slide out room approaches the extended and retracted positions are programmed into the computer and are approximate values. As indicated at 329 in FIG. 9, the main switch 82 is read, and the limit switches are read. A test is made as indicated at 330 as to whether the main switch 82 is in the IN or OUT position. If switch 82 is in the out position, the left and right out limit switches are tested as indicated at 332 and 334, and the left and right motors are shut off as indicated at 336 and 338 when the limit switches are tripped. Similar tests are made of the IN limit switches as indicated at 332a and 334a, and the left 70 and right 68 motors are accordingly shut off as indicated at 336a and 338a.

Figure 10:
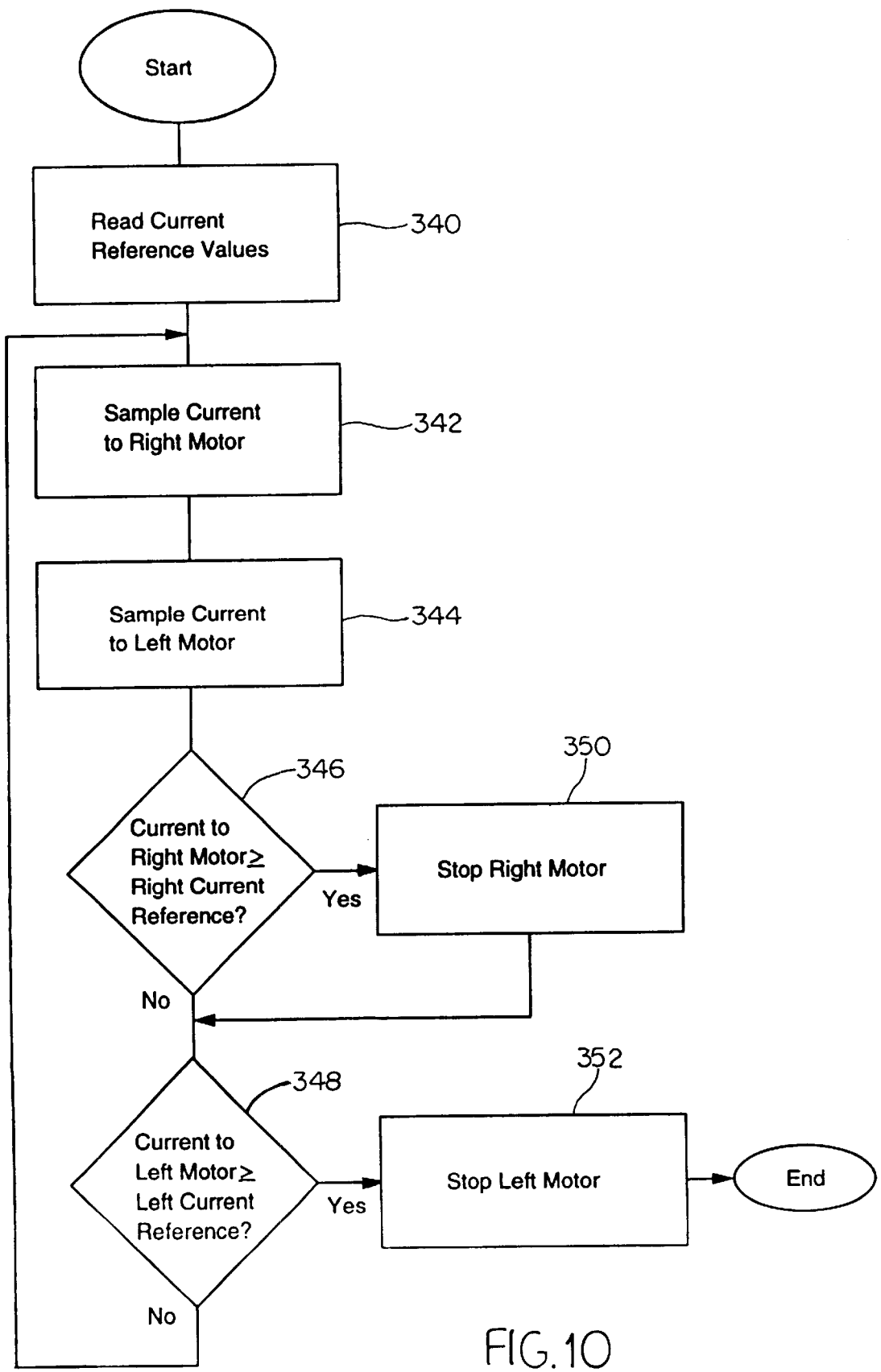
Figure 11:
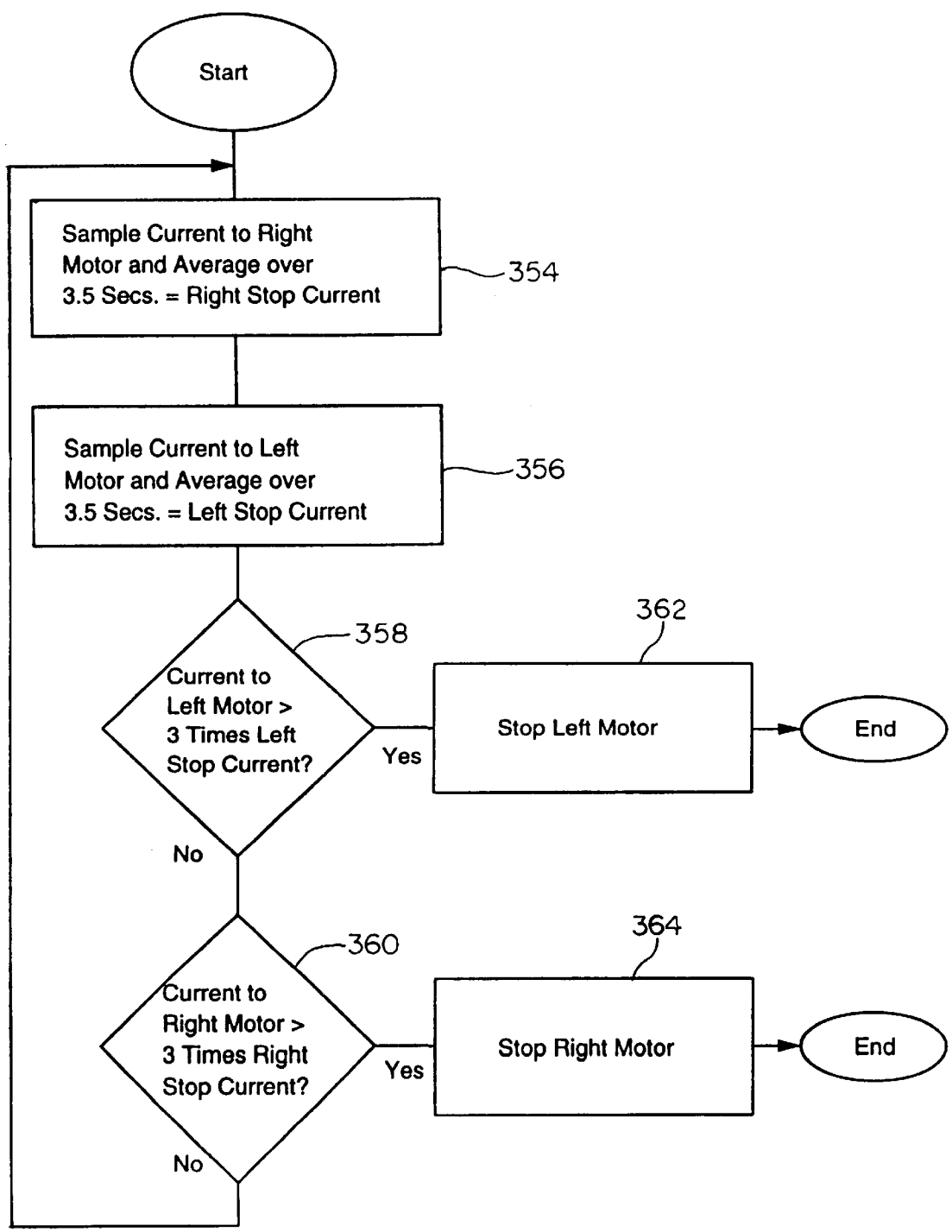

FIGS. 10 and 11 disclose additional embodiments of the termination subroutine. When the jack screws 60, 62 reach the end of their stroke in either the in or the out direction, the current to the corresponding motor 56 or 58 increases markedly. This indication of the end of travel can be used to stop the motors, it being noted that, as in the embodiment of FIG. 9, the limit at which synchronization is discontinued must be programmed separately, as a fixed value within the controller or synchronization must continue until one of the motors is stopped. Referring to FIG. 10, current reference values are read as indicated at 340. These current reference values represent currents which are substantially higher than the normal current during free travel. The current to the right and left motors is continually sampled, as indicated at 342 and 344, and are tested against the fixed current reference values at 346 and 348. When the current to the corresponding motor equals or exceeds the reference value, the motors are stopped as indicated at 350 and 352.

The termination subroutine illustrated in FIG. 11 illustrates the variation of the termination subroutine illustrated in FIG. 10 in which the current is sampled to the right 56 and left 58 motors, as indicated at 354 and 356, an average over 3.5 seconds or another appropriate time period. This average is multiplied by three or another appropriate multiple and is set equal to the right stop and left stop currents, respectively. Tests are made as indicated at 358 and 360, to determine if the current to the left and right motors is greater than, for example, three times the left stop current (for the left motor) or three times the right stop current (for the right motor), respectively. If these tests are met, the left and right motors are stopped, as indicated at 362 and 364. The advantage of the termination routine illustrated in FIG. 11 is that the stop current is not set as a fixed amount. Since the system is normally run by storage batteries, which may become depleted, the current to the left and right motors even during free travel may only be a small fraction of the normal current. In the subroutine illustrated in FIG. 11, the current is sampled during free travel, and the current at which the motors are stopped set at a multiple of this value, thereby obviating the problems of current never attaining the normal stop current levels, or due to a low battery stopping too soon.

Figure 12:
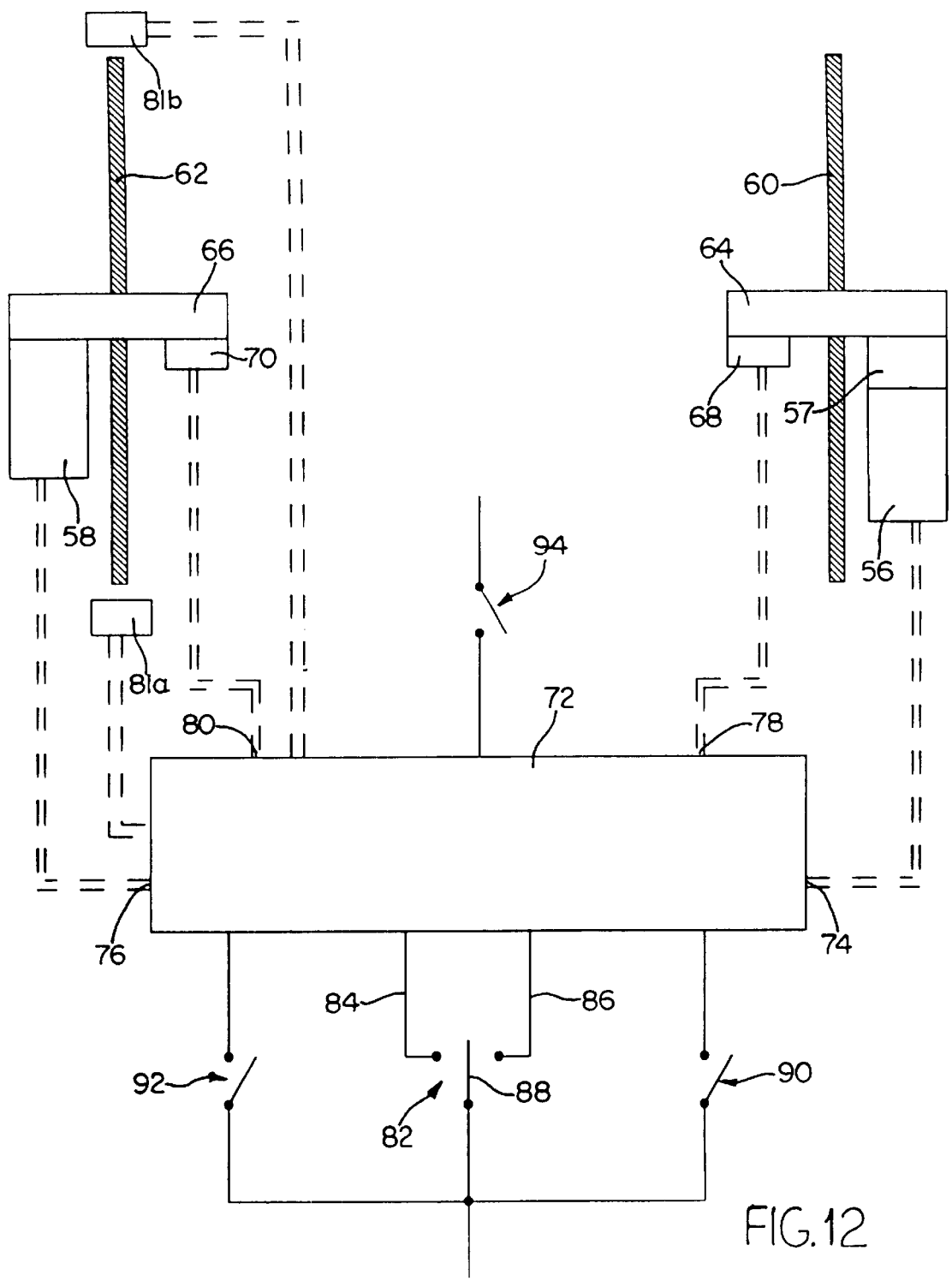
FIG. 12 show a diagrammatical view similar to that of FIG. 3 having a clutch installed intermediate the motor and gear box of the slave motor.

With respect now to FIG. 12, a further embodiment of the Master/Slave version is shown diagrammatically, where a clutch 57 is installed intermediate to motor 56 and gear box 64. Otherwise the embodiment is the same as that of FIG. 4.

Figure 13B:
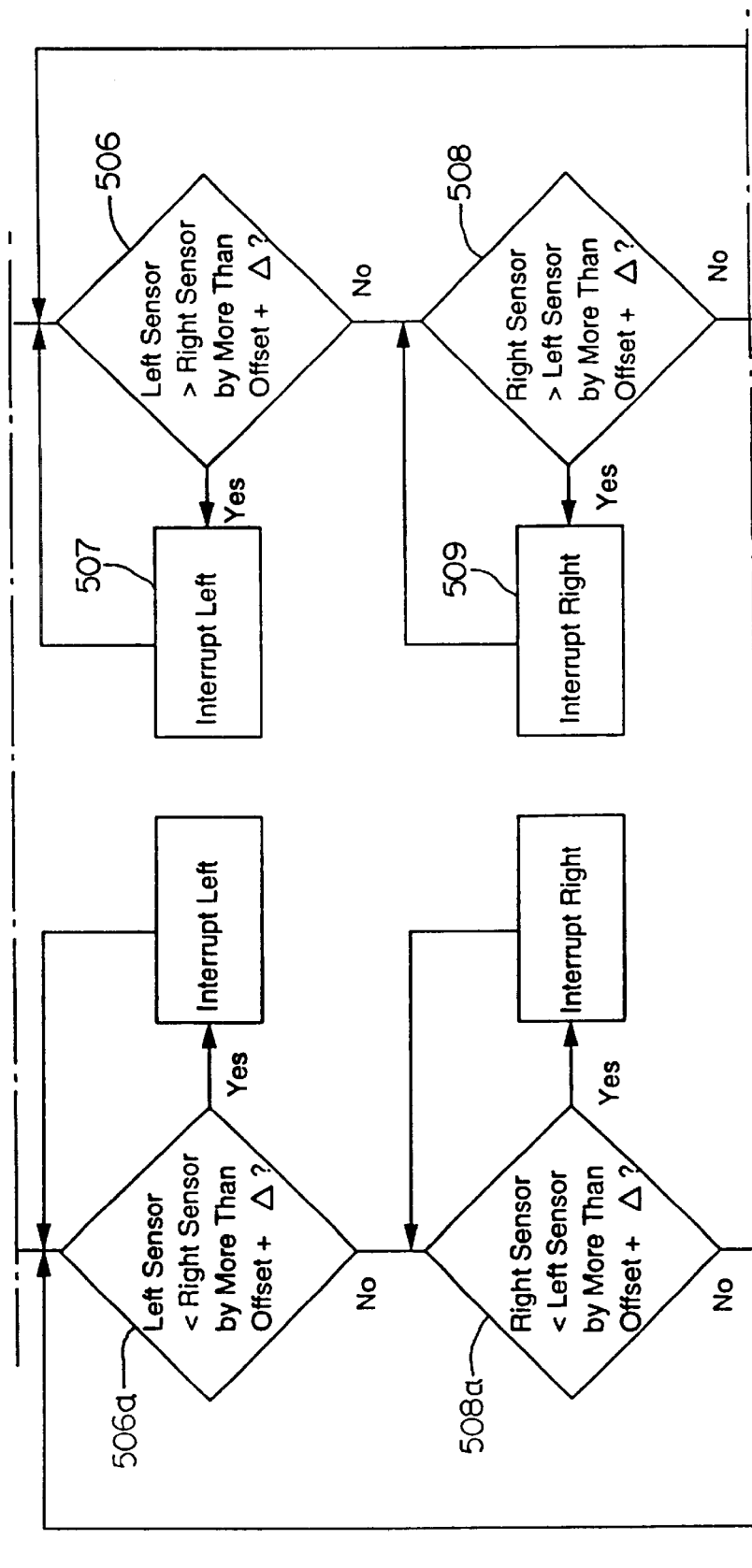
Figure 13C:
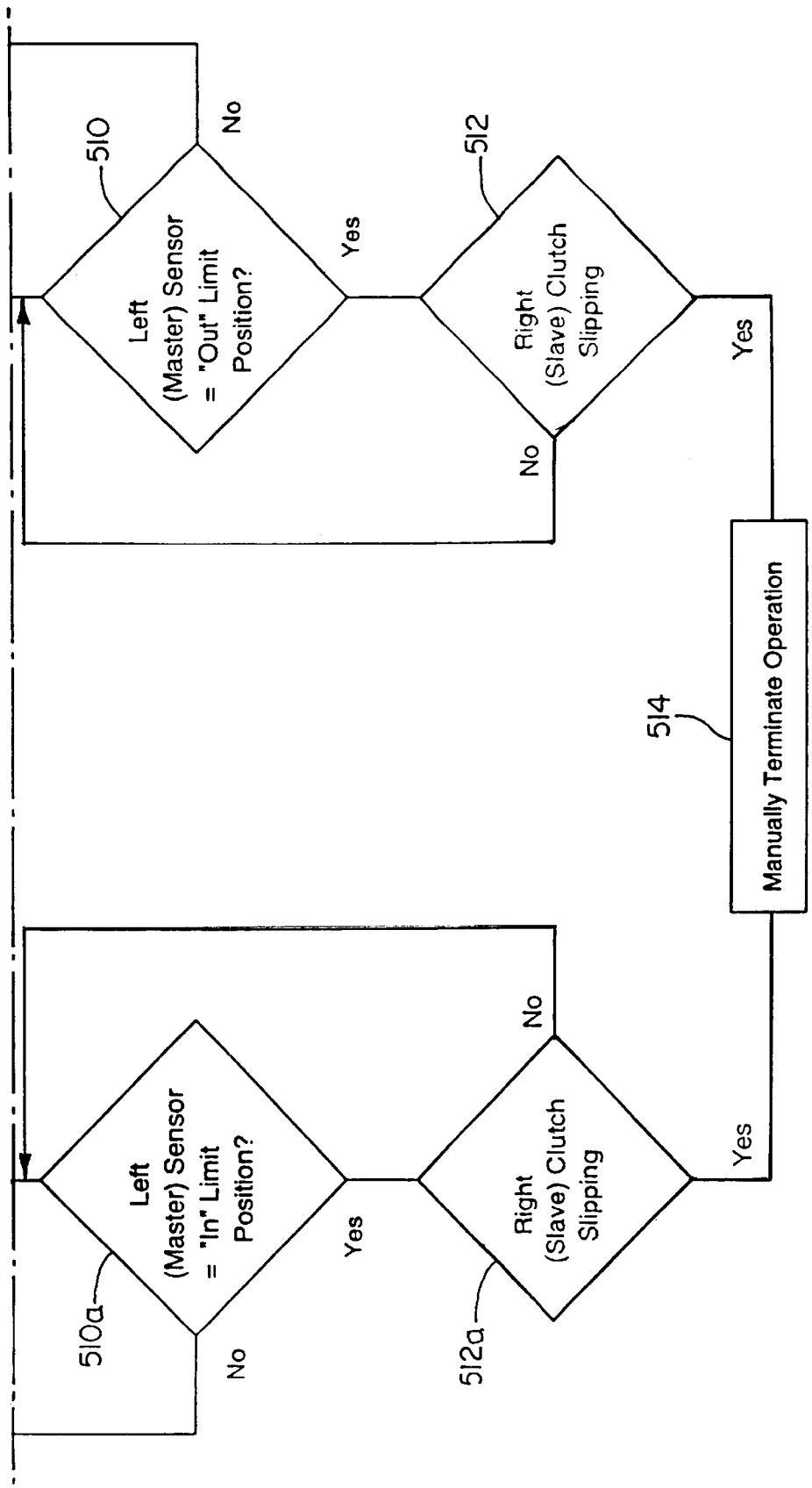

With respect now to FIG. 13, the process sequence begins where, once again the initialization takes place and then the system is checked to see whether the switch 82 is in the IN or OUT mode at 500. If the switch is in the IN position, the read function initiates at 502a and then both motors start in the IN direction at 504a. At 506a and 508a, the synchronization takes place to insure that the left and/or right motor is not running ahead of the other, in a similar manner as mentioned prior, and if it is, it is interrupted so that the corresponding motor can catch up. At 510a, the system checks to see if the master sensor has met its full IN limit position. If it has not, the system continues through the synchronization process, and the motors 56 and 58 continue to operate to move the room in. When the master sensor senses that the room is in its full IN limit position, that motor is stopped, and the system continues to run the right motor only until clutch 57 (FIG. 12) is found to be slipping at 512a, whereupon at 514, a manual termination would occur, which would be by the operator. The analogous process takes place with the OUT movement, including the read function at 502, the motors operating at 504, the synchronization at 506, 507, 508, and 509. Similarly, the OUT position is sensed via 510, 512 and terminated at 514.

Figure 14:
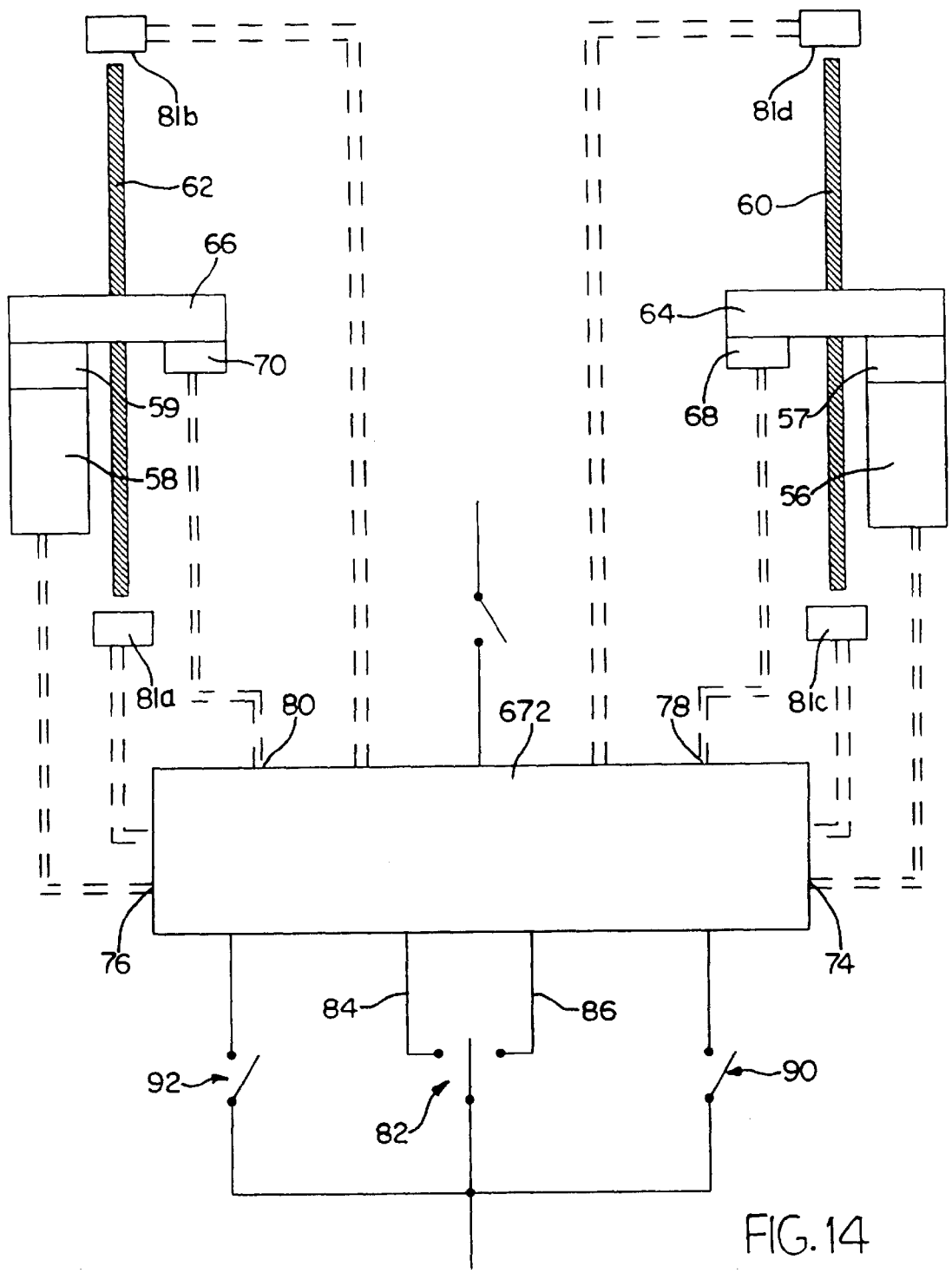
FIG. 14 show a schematic view of an embodiment similar to that of FIG. 5 having clutches installed intermediate its motors and gear boxes.
Figure 15B:
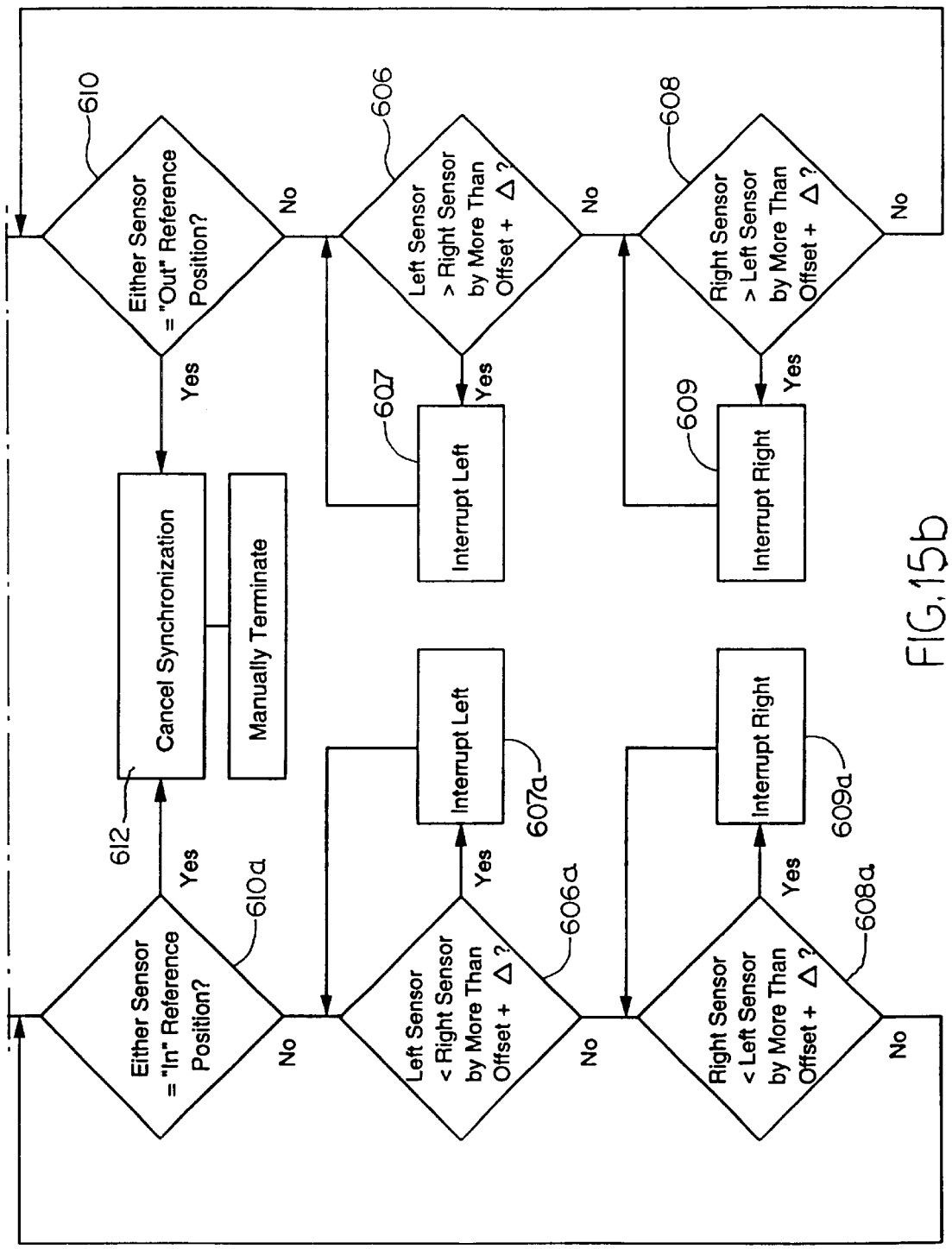

With respect to FIG. 14, a further embodiment is shown which also includes clutches 57 and 59 positioned intermediate the respective motors and gear boxes. This version also has some type of stop mechanism 81a–81d with feedback to control mechanism 672, which would stop and/or sense the location of the room at IN and OUT reference positions. These reference positions would be located a short distance from the IN and OUT limit positions. For example, the stop limit mechanisms 81a–81d, could stop the movement of the various motors when it hit a certain percentage of the linear travel, for example at 95% of its OUT limit position or within 5% of its IN limit position. With respect now to FIG. 15, the synchronization process would include once again at 600 determining whether the room is to be moved IN or OUT, and thereafter reading the sensor OUT limits and offset at 602. Both motors 56 and 58 are thereafter engaged in the OUT direction at 604. During the outward travel, the system will recognize whether the room is at its OUT reference point, as well as keep the left and right motors synchronized at 607, 609. More specifically, at 610 the system will test to determine whether the sensor is equal to the OUT reference. If it has not, the system continues through sequences 606 and 608 where the synchronization process occurs. If the sensor has met the OUT reference position, that is, the room has moved out to the reference point, somewhat short of the fully OUT stop position, the synchronization will be canceled at 612. This does not cancel the movement of the motors, but rather the room will continue moving outward until both sides reach their mechanical full OUT positions, at which point both clutches will begin to slip, and the operation will be manually discontinued. The same is true of the IN movement, where read functions occur at 602a, the motors begin at 604a, the synchronization process occurs at 606a, 607a, 608a, and 609a; and the termination process occurs at 610a and 612.

Up to this point, all of the previous embodiments had some type of electronic stopping mechanism, shown diagrammatically in the figures as stop mechanisms 81a–81d, where the electronic stopping mechanism existed on at least one of the left or right sides. With respect now to FIGS. 16–19, two further embodiments will be shown where there is synchronization only, but no electronic stopping mechanism on either side of the slide out room. Rather, the synchronization will exist during the extension or retraction of the slide out room, but mechanical mechanisms will stop the room in the fully in or fully out positions. This will be accommodated generally by mechanical stop mechanisms, for example in the extended position where the slide out room structure includes a metal-to-metal engagement such as metal brackets to stop the room, whereas in the fully retracted position, the ceiling around the room against the wall 12 would cause the mechanism to stop. In each of these cases, some type of a clutch mechanism would be installed to begin slipping when a mechanical engagement takes place.

Figure 16:
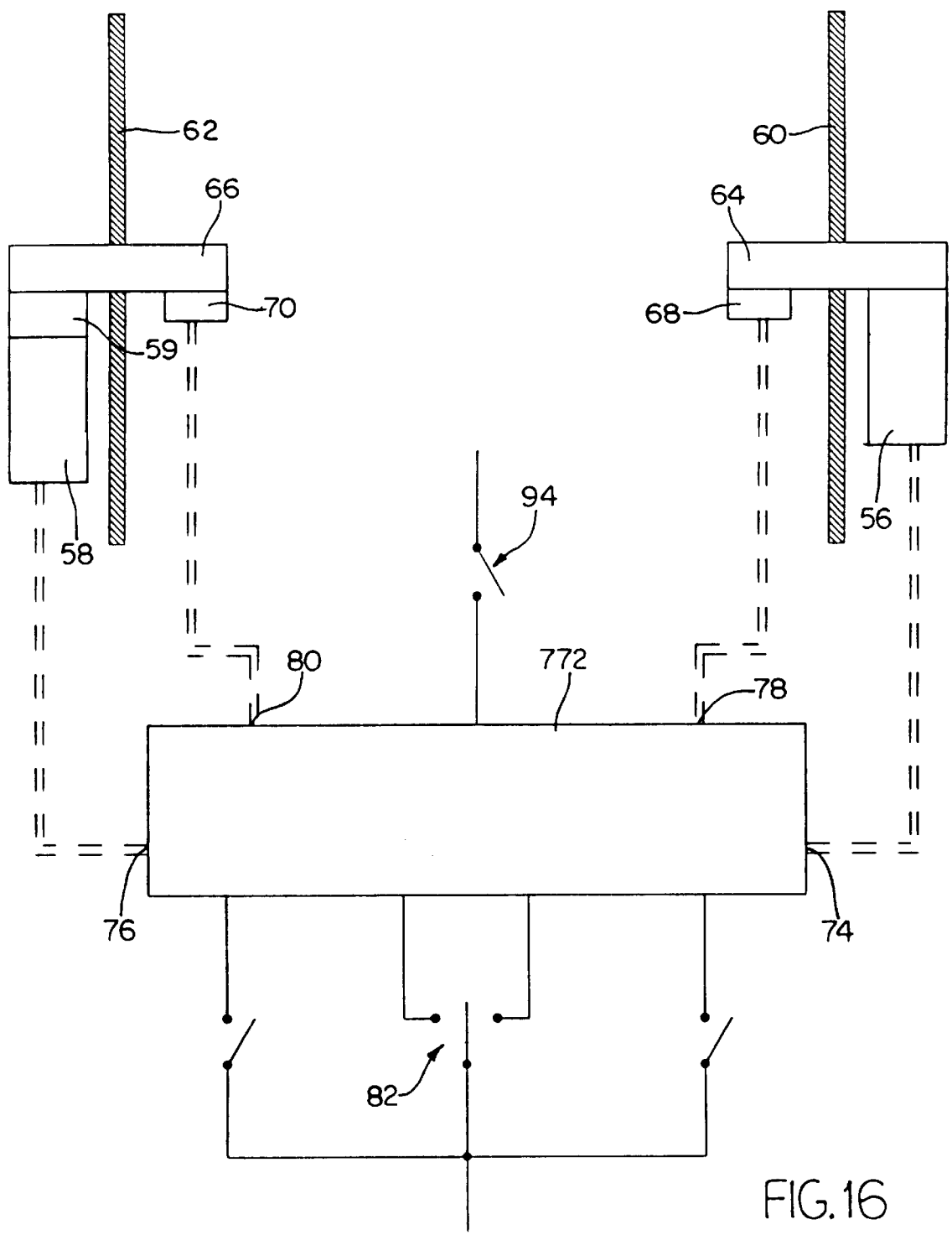
FIG. 16 show a schematic view of an embodiment similar to that of FIG. 3 having a clutch installed intermediate one of its motors and gear boxes.

With respect first to FIG. 16, the diagrammatical view shows a clutch 59 on one side only of the drive mechanism. This would be placed on the leading side of the room as it relates to the synchronization and offset. With respect to FIG. 17, it is shown that the control mechanism 772 only includes the synchronization features of 706 and 708 with their corresponding interrupts 707 and 709 on the out direction, and the synchronization of 706a and 708a, with their associated interrupts 707a and 709a on the in direction. When the slide out room 32 is either fully extended or fully retracted, the slide out room would engage a mechanical stop mechanism as described above, whereupon clutch 59 would begin to slip. In this embodiment, the synchronization would continue to operate on the opposite side of the slide out room, and the interrupt feature of that synchronization process would stop the other motor. The termination process for this embodiment would be to manually hear the clutch slipping, which would be an audible "ticking" noise, and the operator would manually let off the switch 82. It should be appreciated in this embodiment, that if the room is not properly sealed on the fully retracted position, upon the synchronization process terminating the alternate motor as described above, the differential element subject to process 706 or 708 could be increased through the encoder in order to increase the amount of override that the synchronization process would provide, before executing the interrupt function 707, 707a, 709 or 709a.

Figure 17B:
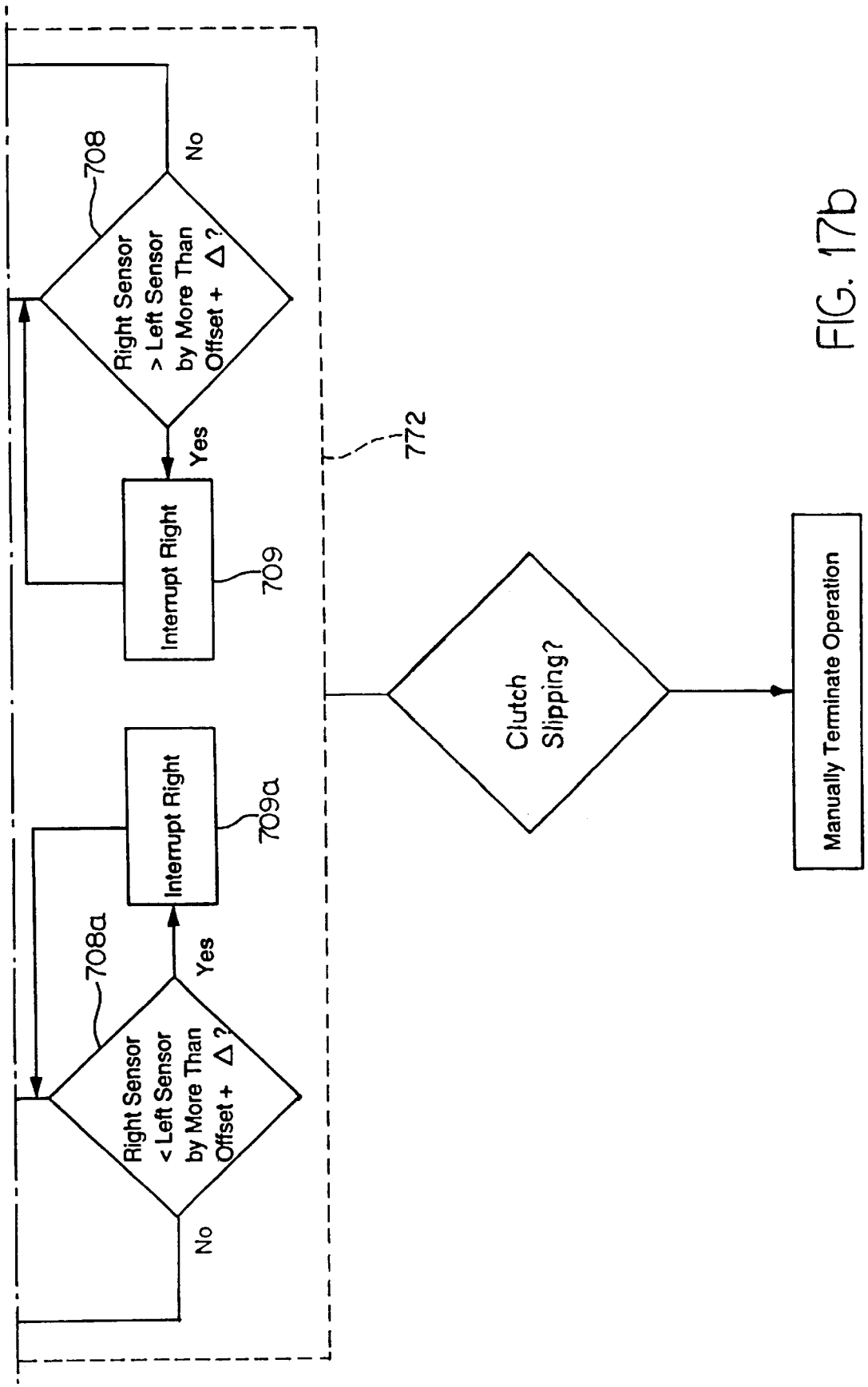

With respect to FIG. 17, it should be appreciated that the start function is similar to that previously discussed including the directional sensing at 700, the read function at 702, 702a, and the motor start function at 704, 704a.

Figure 18:
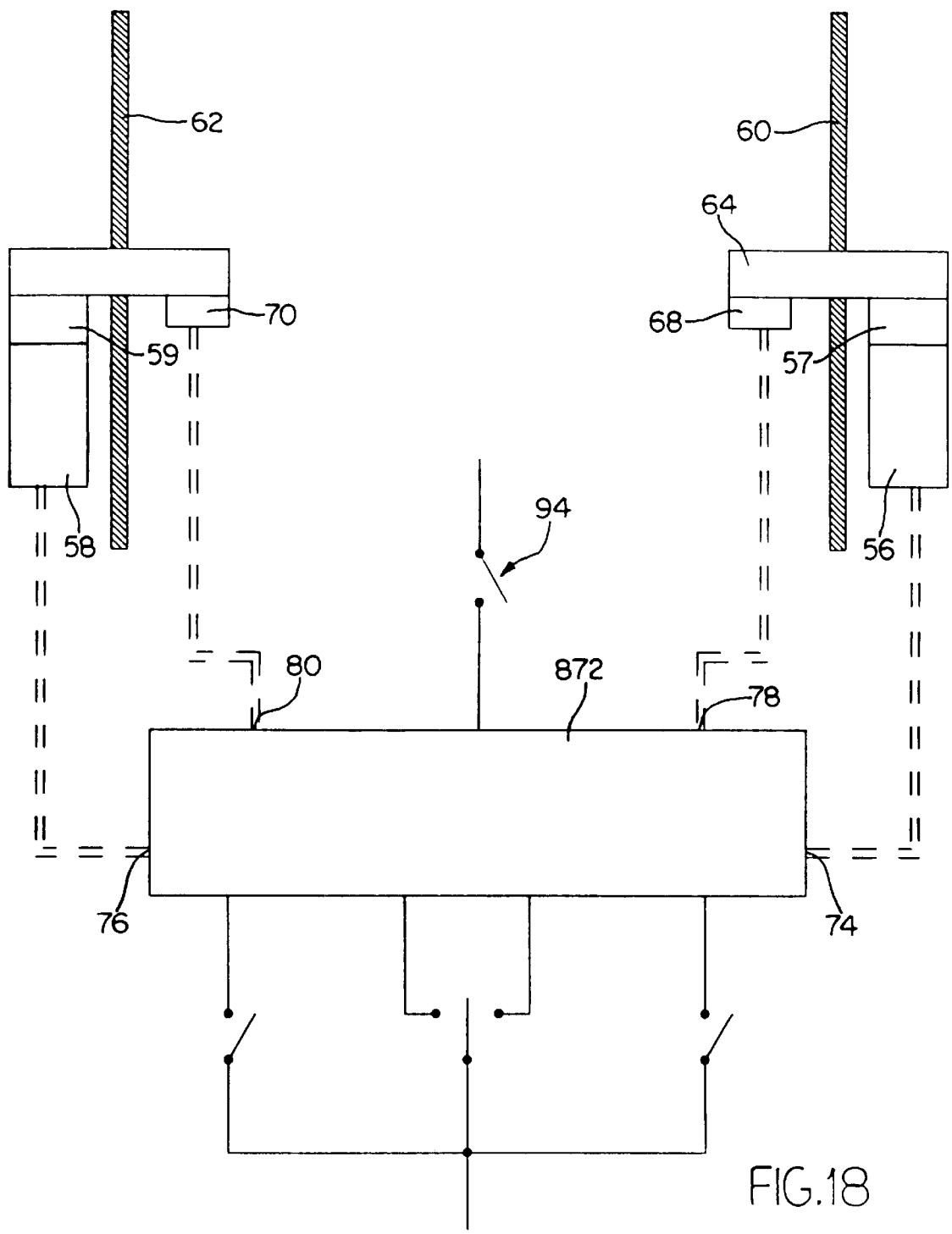
FIG. 18 shows a schematic view of an embodiment similar to that of FIG. 5 having clutches installed intermediate both of its motors and gear boxes.
Figure 19A:
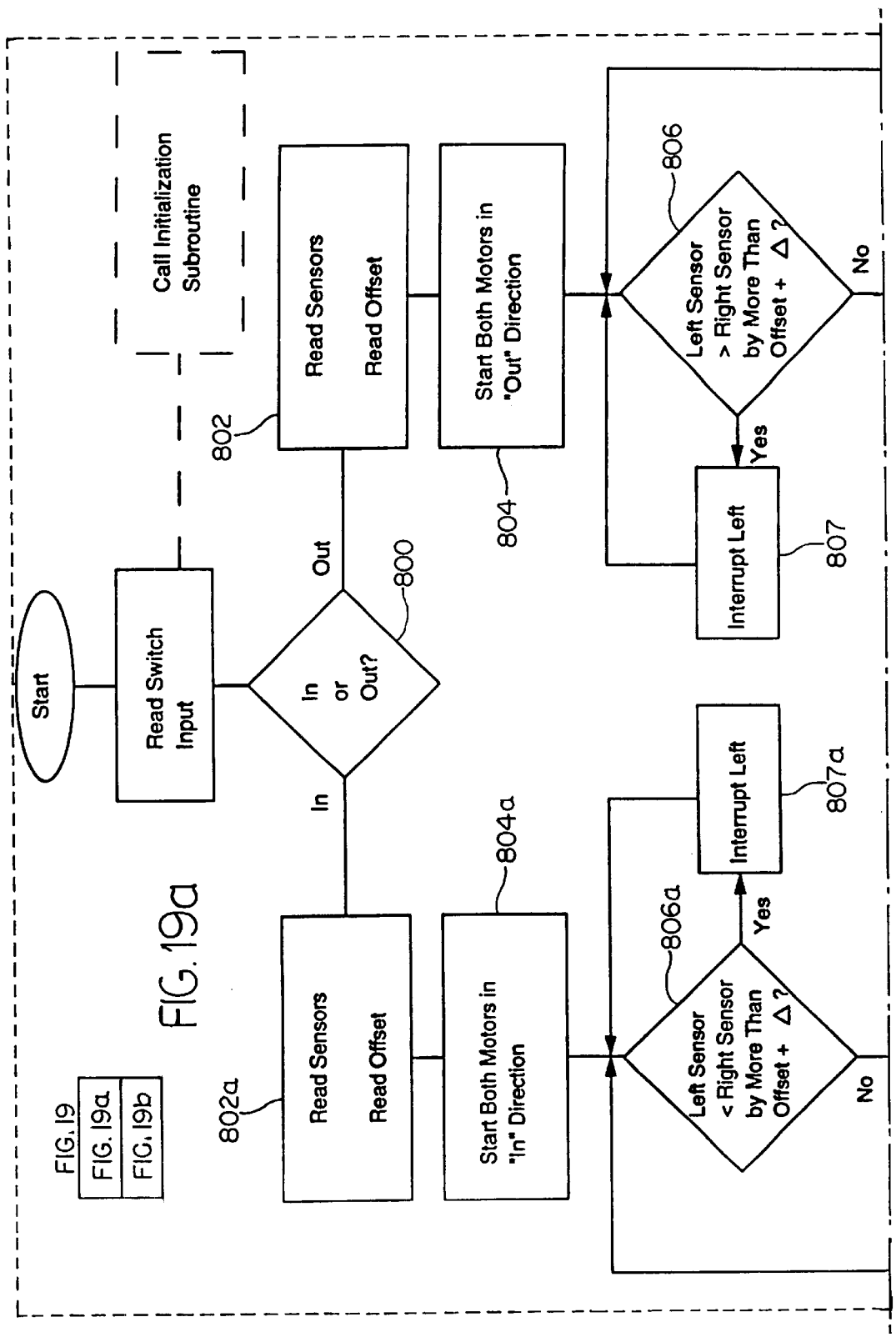
FIGS. 19a and 19b show a flow chart of a control mechanism for use with the embodiment of FIG. 18.
Figure 19B:
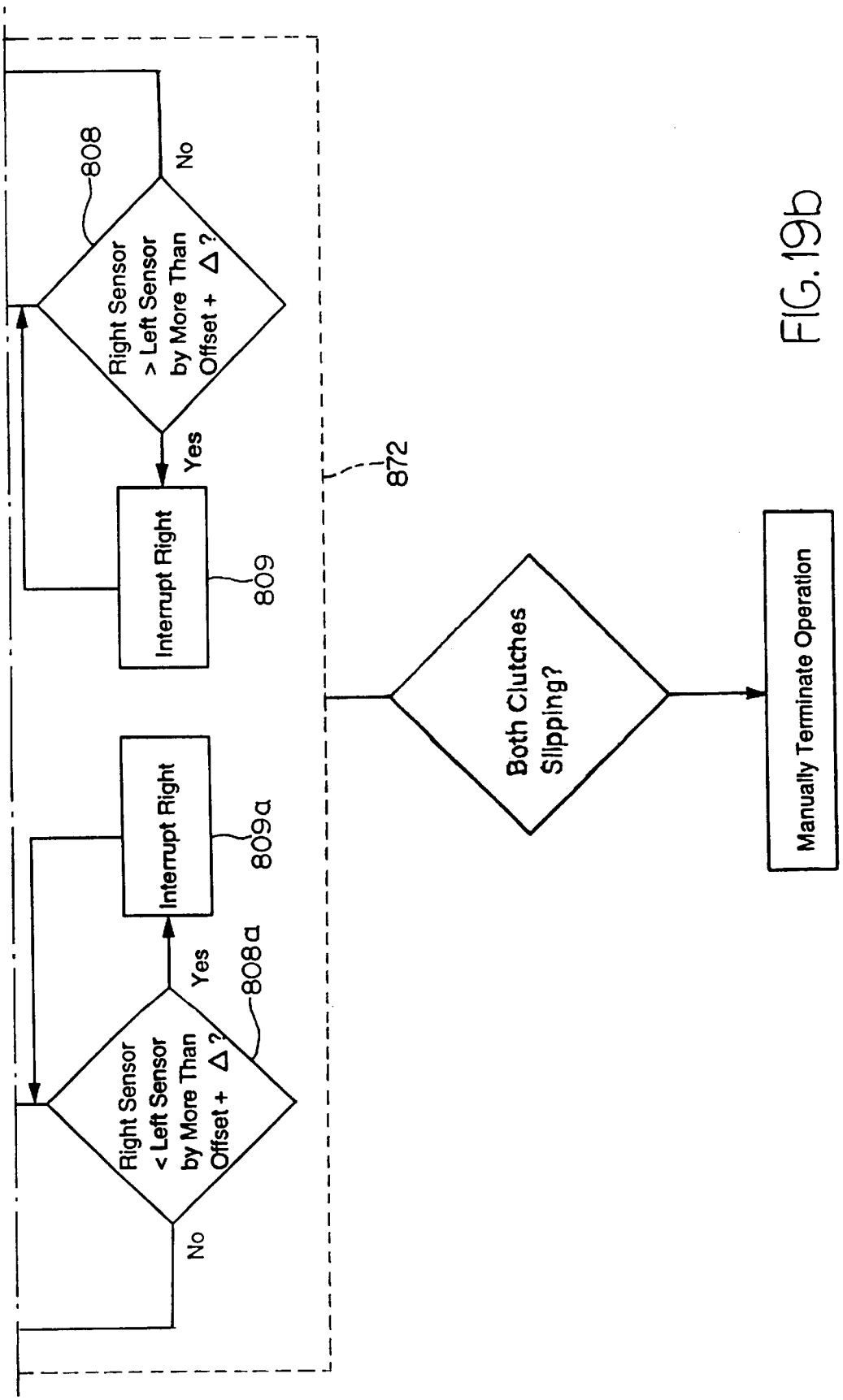

With respect now to FIGS. 18 and 19, an embodiment is shown which is very similar to that shown in FIGS. 16 and 17, but which allows both right and left sides of the slide out room to move in or out to their true in or out position against a mechanical stop yet has a clutch on each side to prevent any damage to both motor actuators. As shown in FIG. 18, each drive side has a clutch, clutch 57 on the right-hand side, and clutch 59 on the left-hand side. Control mechanism 872 would include other similar initialization features such as 800, 802, 804, 802a, 804a, as well as synchronization only features as shown in FIG. 19, that is, functions 806, 806a, 807, 807a, 808, 808a, 809, and 809a. As the slide out room is moved into its full out or full in position, the room would move under synchronization as described above, yet when the room has reached its full mechanical stop position, both clutches would slip where the operation would manually terminate. It may be the case, however, that the offset plus the differential, which is programmed into the synchronization process, would allow the synchronization process to stop the second motor in the interrupt mode, rather than actually hitting the mechanical stop.

Figure 20B:
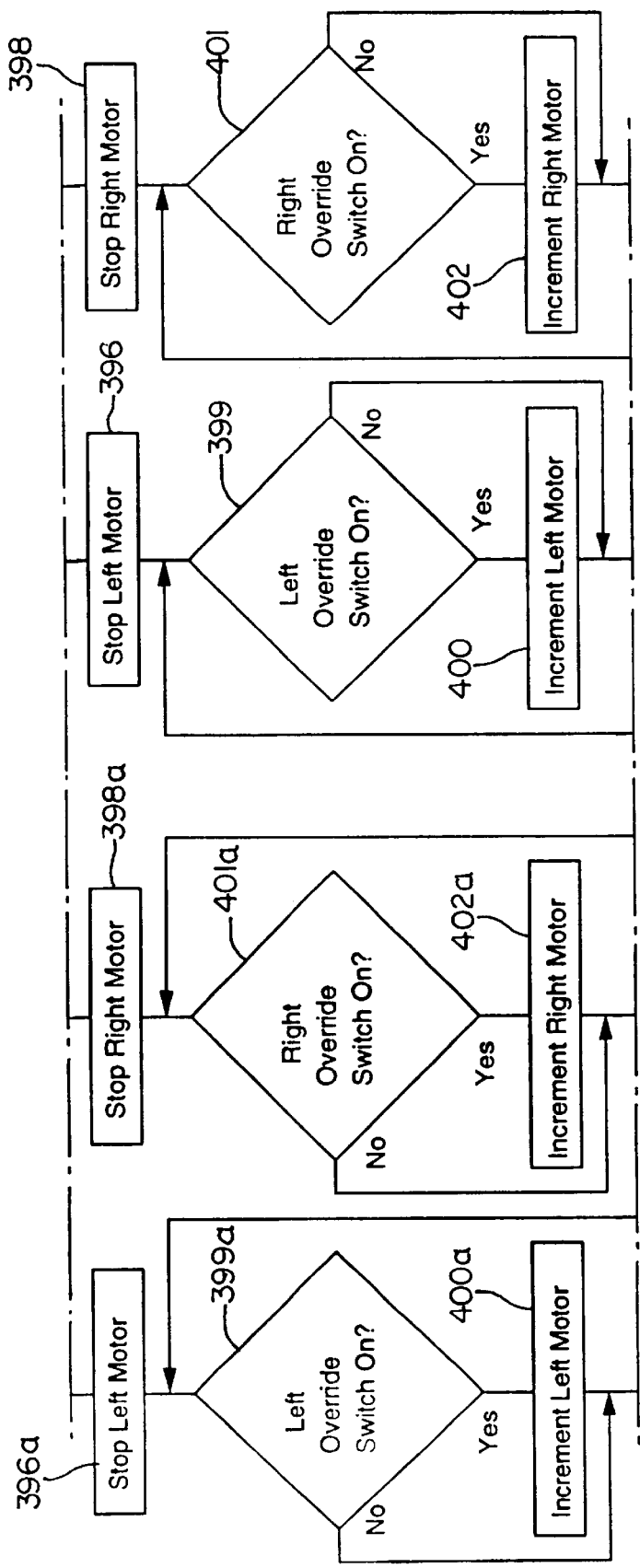
Figure 20C:
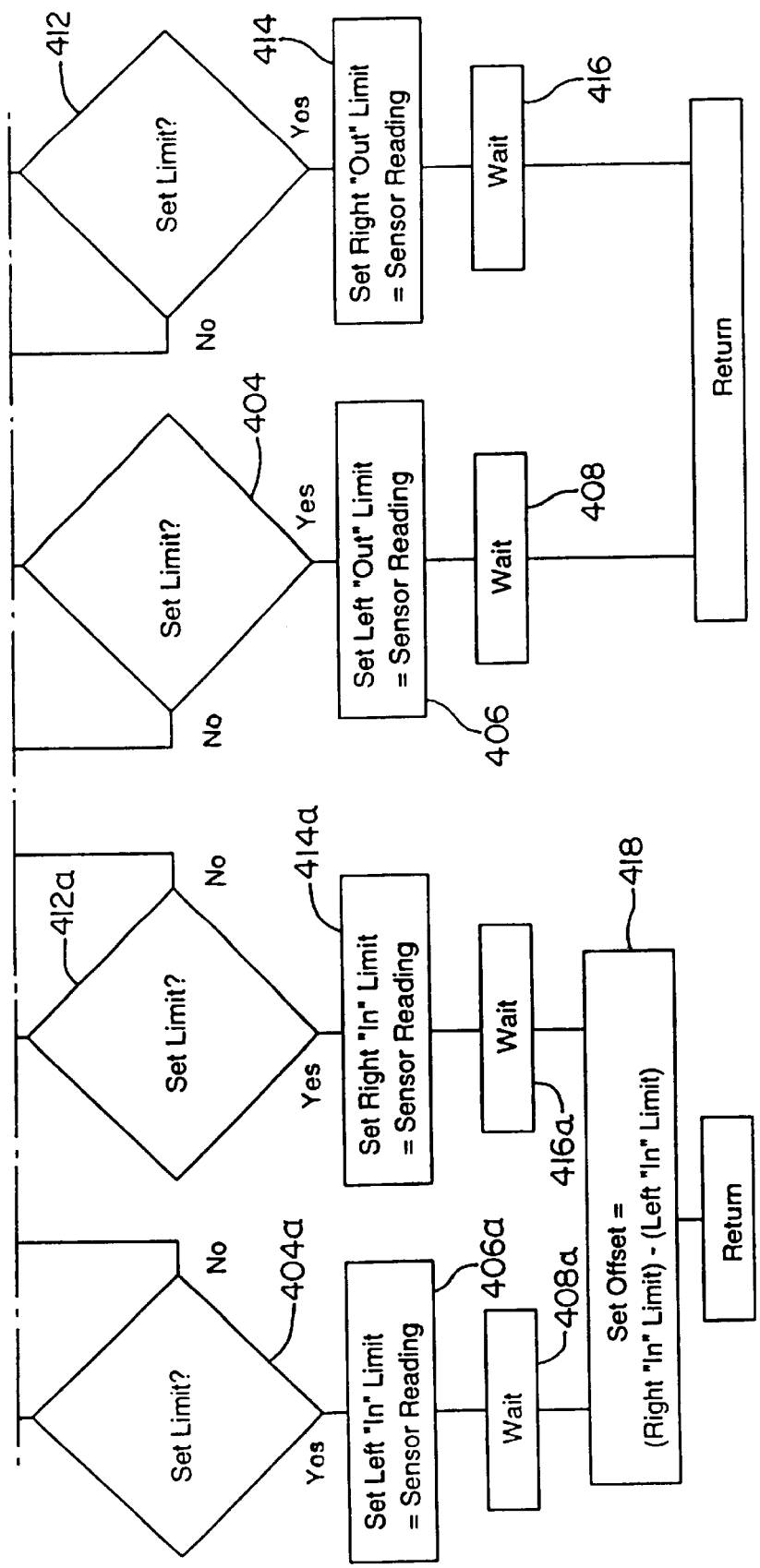
Figure 21:
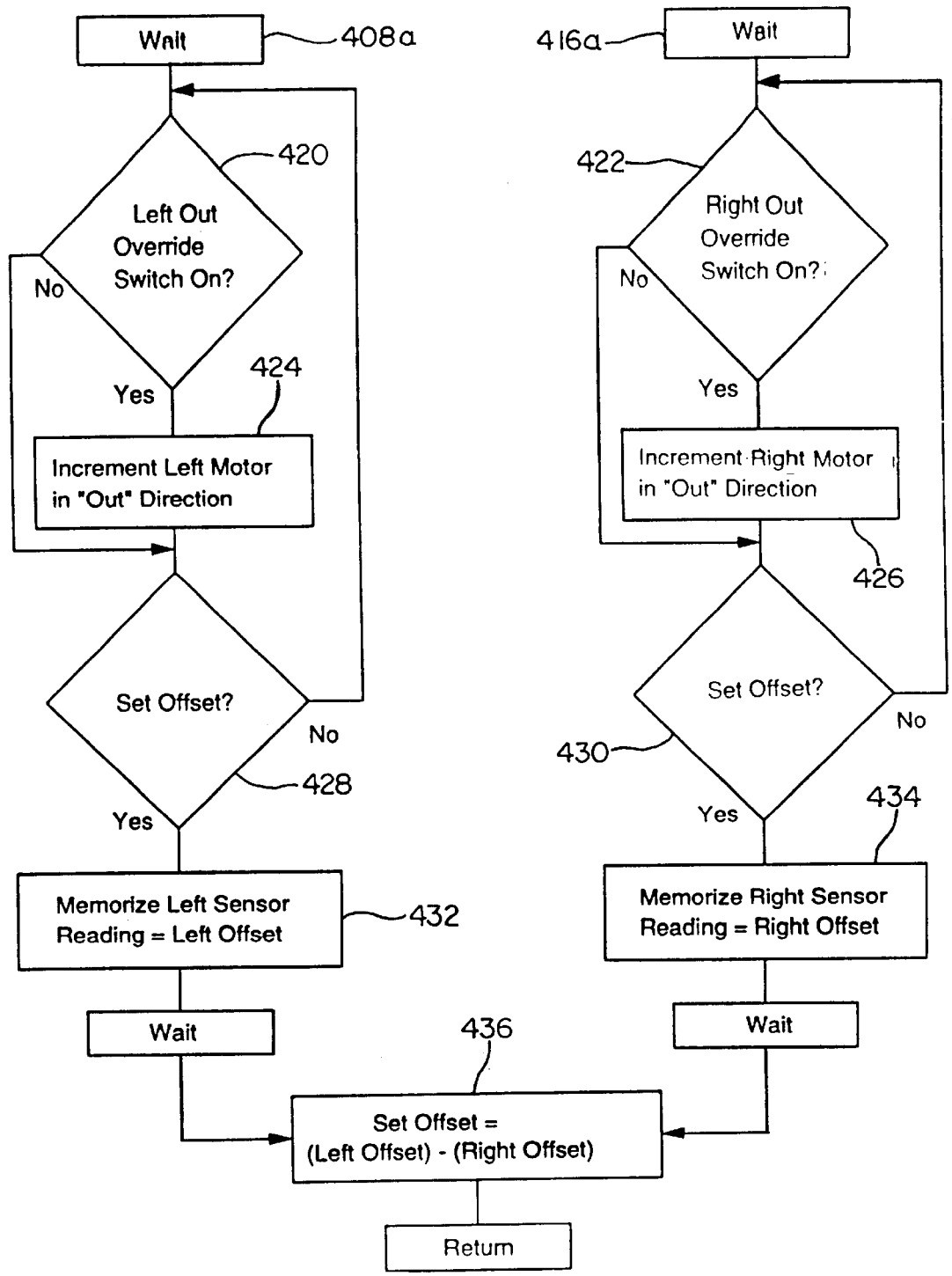
FIG. 21 shows a flow chart of the method of setting the offset.

Finally, with respect to FIGS. 20 and 21, the initialization subroutine and the process of setting the offset will be described. FIG. 20 illustrates the initialization subroutine which is called as indicated in 98 in any of FIGS. 4–19. The initialization subroutine may be called, for example, when the set switch 94 is pushed. As discussed above, the set switch 94 and the left and right override switches 92, 90 are concealed beneath the switch cover (not shown) through which the switch 82 projects. Accordingly, a serviceman or installer removes the switch cover and pushes the switch 82 in either the in or out directions, while simultaneously pushing the set switch 94. The initialization subroutine of FIG. 20 is then called. As indicated at 366 in FIG. 20, the main switch is read, and the program is instructed to either read the sensors or count the pulses that would be produced by an encoder. Although the rest of the subroutine is described with respect to fixed position sensors, pulse counts can be memorized as well as limits set based on sensor readings. The switch 82 is tested, as indicated at 388, to determine if the slide out room is being either extended or retracted. If the room is being extended, as indicated in 390, both motors are started in the OUT direction. As indicated at 392 and 394, the sensors (or pulse count registers) are tested to determine if the left or right OUT limit positions have been met or exceeded. The serviceman manually operates the room by operating the switches 92, 90 until the slide out room is in the correct position for setting the set points.

In the case of embodiments of FIGS. 4, 6, 13, and 15, the full OUT and IN limit positions would be set. In the case of the embodiments of FIG. 7, reference positions are set which approximate a position just short of where the OUT limit positions are to be set. When the reference OUT limit positions have been attained for the left and right actuators, the left and right motors are stopped accordingly, as indicated at 396 and 398. The left override switch 92 is then operated at 399 while the switch 82 is in the out position, to increment the left motor while the right motor remains stopped, as indicated at 400. When the left actuator attains the desired OUT limit position, which the serviceman determines by a number of factors, including observing the deflection of the slide out room and compression of any of the seals sealing the slide out room to the main living quarters, the override switch 92 is released and the set switch 94 is pushed, as indicated at 406. The left OUT limit position is then set equal to the sensor reading when the set switch 94 is pushed, as indicated at 404. This reading is stored in memory, and used as the out limit until the initialization subroutine of FIG. 16 is again called. The subroutine then waits at 408, until the right stop limit has been set in the same way. The right override switch 90 is tested at 401 and the right motor is incremented as indicated at 402 until the set switch 94 is then again operated, as indicated at 412. When this occurs, the right out limit is set equal to the sensor reading as indicated by 414. The program then waits as indicated at 416, in the event that the left sensor was not set first, whereupon the program returns.

The IN limit positions are set in much the same way as the OUT limit positions. Accordingly, both motors are started in the IN direction as indicated at 390a, the left and right sensors are tested as indicated at 392a and 394a, and the left and right motors are stopped at the reference in limits (in the case of FIG. 7) as indicated at 396a and 398a, or until either IN limit is attained, whereupon both motors are stopped. The left override switch is tested, as indicated at 399a, the left motor incremented as indicated at 400a, and the in limit set by pushing the set switch 94 as indicated at 404a and 406a. The subroutine then waits at 408a, until the right stop limit has been set in the same way. The right override switch 90 is then operated to set the in limit of the right actuator, as indicated by the test at 401a, which increments the motor as indicated at 402a. A test is made as to whether the set switch 94 is pushed, as indicated at 412a. The right in reading is then set equal to the sensor reading, as indicated at 414a. The program then waits as indicated at 416a, in the event that the left sensor was not set first, whereupon the program returns.

The step of setting the IN limit position also includes the step of setting the offset between the actuators, which is discussed above with respect to the main routine illustrated in FIG. 4. Accordingly, as indicated at 418, the offset is set equal to the difference between the right IN limit position and the left IN limit position. The limits can also be set by moving the slide out room to the IN position, setting the IN limits and offset, and then moving the slide out room to the OUT position, preferably under synchronization, until either of the out limits are attained, whereupon both motors are stopped. The override switches 90, 92 are then used to position the slide out room where both out limits are set. Furthermore, the offset may be set as the difference between the OUT limits instead of the IN limits.

Referring to FIG. 3, a variation of the way in which the offset is set is described. The offset is set at 418 in FIG. 20 as being set as the difference between the right IN limit position and the left IN limit position. However, it may be desirable to set the offset when the slide out room has been moved away from the IN limits, because setting the offsets at the IN limits may cause the slide out room to be obstructed by other parts of the mobile living quarters. The subroutine illustrated in FIG. 21 is an alternative to the step at 418 in FIG. 20, and permits setting of the offset after the slide out room has been advanced away from the IN limits. Referring to FIG. 21, the left and right override switches 92, 90 are tested as indicated at 420, 422. Accordingly, the left motor is incremented outwardly as indicated at 424 if the left override switch 92 is pushed in; similarly, the right motor is incremented outwardly as indicated at 426 if the right motor override is pushed. Alternately, the slide out room may be incremented inwardly from the out position for setting the offsets, or be incremented in either direction from a position between the OUT and IN limits. The set switch 94 is then tested as indicated at 428 and 430. If the serviceman is satisfied with the location of the slide out room, the set switch 94 is pushed (once for each of the left and right motors) and the left sensor reading is memorized when the set switch 94 is pushed after the left motor override switch 92 has been operated as indicated at 432, and the sensor reading of the right sensor is memorized after the set switch 94 is pushed after the right motor override switch 90 is operated, as indicated at 434. After waiting until completion of the other motor, the offset, as indicated at 436, is calculated to equal the difference between the left and right offset. Accordingly, the offset, which is used in the main program illustrated in FIG. 4, is set as the difference in the sensor readings set by the serviceman.

Figure 22:
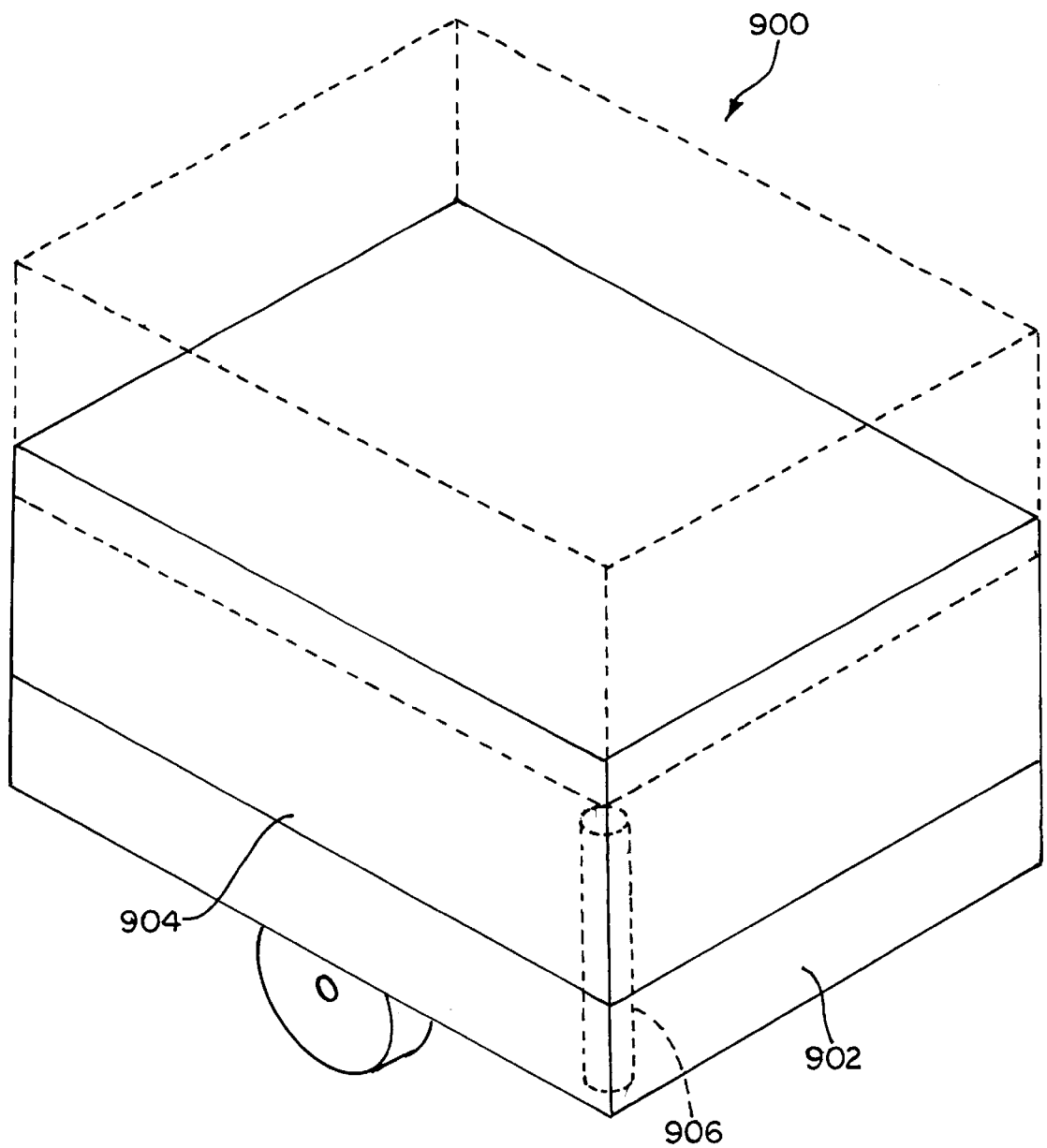
FIG. 22 shows a diagrammatical view of a vertical actuating member.

It should be appreciated that many varieties of the invention could be conceived by those skilled in the art, utilizing the concepts shown herein. One variety of embodiment which could be useful would be to use the synchronization method of actuation in the vertical sense. This could be useful for such items as pop-up campers, and the like, where the expandable structure moves vertically rather than horizontally. In such an embodiment, the device would have more than 2, and possibly 4, actuators. For example, as shown in FIG. 22, a pop-up camper 900 could include a base portion 902 and an upper portion 904, where the upper portion 904 is movable between the position shown in solid line, to the position shown in phantom line. Most likely in such a device, actuators 906 would be positioned in all four corners of the device for moving the upper portion 904.

What is claimed is:

1. Mobile living quarters comprising a frame, a fixed structure mounted on said frame defining main living quarters, an expandable structure movable relative to the fixed structure defining an auxiliary living volume, said expandable structure being movable between a retracted position retracted within the main living quarters and a extended position extended from the main living quarters, and at least two actuators for effecting movement between the retracted and extended positions, each of said at least two actuators including an operating member secured to said expandable structure and extending and retracting relative to the main living quarters to effect movement of the expandable structure between the extended and retracted positions, a position signal generating means for generating a position signal that varies in accordance with the position of the operating members, and control means for controlling said actuators in response to said position signals, said control means including synchronizing means for controlling said actuators to assure that the operating members extend and retract at substantially the same rate.

2. Mobile living quarters as claimed in claim 1, wherein said control means includes synchronization termination means for terminating said synchronizing means before said expandable structure is moved into a fully extended position or into a fully retracted position.

3. Mobile living quarters as claimed in claim 1, further comprising means to stop the expandable structure when proximate a fully extended position and a fully retracted position.

4. Mobile living quarters as claimed in claim 3, wherein said stop means comprises mechanical stops which prevent further movement of the expandable structure.

5. Mobile living quarters as claimed in claim 4, further comprising at least one clutch mechanism operatively connected to at least one of said actuators, which disengages said at least one actuator upon engagement of the expandable structure with said mechanical stops.

6. Mobile living quarters as claimed in claim 3, wherein said stop means is incorporated in said control means.

7. Mobile living quarters as claimed in claim 6, wherein said stop means stop said actuators when in and out stop limits are attained by each of said actuators.

8. Mobile living quarters as claimed in claim 7, wherein said control means includes synchronization termination means for terminating said synchronizing means before the in and out stop limits are attained by one of said actuators to permit each of said actuators to move to the in and out stop limits independently of another of said actuators.

9. Mobile living quarters as claimed in claim 8, wherein said synchronization termination means includes means for comparing each of said position signals with an out reference level when said expandable structure is moved toward the extended position and for comparing each of said position signals with an in reference level when said expandable structure is moved toward the retracted position, said synchronization termination means being responsive to said comparing means for terminating said synchronizing means when either of said position signals attains either of said reference levels.

10. Mobile living quarters as claimed in claim 9, wherein said reference levels are set as a predetermined fraction of the in and out stop limits.

11. Mobile living quarters as claimed in claim 7, wherein in and out limit switches are mounted for actuation by each of said actuators, said in and out limit switches establishing said in and out stop limit positions.

12. Mobile living quarters as claimed in claim 1, wherein said control means includes setting means for setting in and out stop limits, said setting means including current measuring means for measuring an electric current drawn by each of said actuators, and current comparing means for comparing said electrical current drawn by each of said actuators with a predetermined reference level and setting said in and out stop limits for each of said actuators when the current drawn exceeds the predetermined reference level.

13. Mobile living quarters as claimed in claim 1, wherein said control means includes setting means for setting in and out stop limits, said setting means including current measuring means for measuring an electric current drawn by each of said actuators, means for averaging the current drawn from each of said actuators over a predetermined time period to establish an average current draw, means for comparing the average current draw with a multiple of the average current draw and setting the corresponding stop limit when the average current draw exceeds said multiple of the average current draw.

14. Mobile living quarters as claimed in claim 1, wherein said synchronizing means includes reading means for reading said position signals generated by each of said position signal generating means, a calculating means for forming the difference between position signals, and interrupting one of said actuators when the difference between the position signal of said one actuator exceeds the position signal of another of said actuators by more than a predetermined offset.

15. Mobile living quarters as claimed in claim 14, wherein said calculating means includes means for setting an offset reference as the difference between said position signals when the expandable structure is in the retracted position.

16. Mobile living quarters as claimed in claim 14, wherein said calculating means includes a means for setting an offset reference as the difference between said position signals when said expandable structure is in a position other than a fully retracted position.

17. Mobile living quarters as claimed in claim 14, wherein said expandable structure is defined as a slide out room movable horizontally relative to said fixed structure.

18. Mobile living quarters as defined in claim 1, comprising more than one pair of actuators.

19. Mobile living quarters as claimed in claim 18, wherein said expandable structure is defined as a slide out room movable vertically relative to said fixed structure.

20. Mobile living quarters as defined by claim 1, further comprising a stop mechanism for stopping said expandable structure at a predetermined position.

21. Mobile living quarters as defined by claim 20, wherein the predetermined position includes a fully extended position and a fully retracted position.

22. Mobile living quarters as defined by claim 20, wherein the predetermined position includes a percentage of a fully extended and a fully retracted position.

23. Mobile living quarters as defined by claim 22, wherein the predetermined position is approximately 95% of a fully retracted position and 95% of a fully extended position.

24. Mobile living quarters as defined by claim 20, wherein the stop mechanism is located on only one of said actuators.

25. Mobile living quarters as defined by claim 20, wherein the stop mechanism is cooperable with more than one of said actuators.

26. Mobile living quarters as defined by claim 16, where a clutch is positioned operatively connected to one of said actuators.

27. Mobile living quarters as defined by claim 25, further comprising clutches positioned operatively connected to each of said actuators.

28. Mobile living quarters as defined by claim 23, further comprising means to terminate the synchronization means, at said predetermined position.

29. Mobile living quarters comprising a frame, a fixed structure mounted on said frame defining main living quarters, an expandable structure movable relative to the fixed structure defining an auxiliary living volume, a mounting mechanism for mounting said expandable structure for sliding movement relative to the main living quarters for movement between a retracted position retracted within the main living quarters and an extended position extended from the main living quarters, and a plurality of actuators for effecting movement between the retracted and extended positions, each of said actuators including an operating member secured to said expandable structure and extending and retracting relative to the main living quarters to effect movement of said expandable structure between the extended and retracted positions, said actuators further including position signal generating means for generating a position signal that varies in accordance with the position of the operating members, and control means for controlling said actuators in response to said position signal, said control means including setting means for setting in and out stop limits for said actuators.

30. Mobile living quarters as claimed in claim 29, wherein said setting means includes measuring means for measuring an electric current drawn by each of said actuators, and a current averaging means for averaging the current drawn from each of said actuators over a predetermined time period to establish an average current draw, and wherein said in and out stop limits are set as a function of said average current draw.

31. Mobile living quarters as claimed in claim 29, wherein said control means includes a comparator for comparing an average current draw with a multiple of the average current draw and setting the corresponding stop limit when the average current draw exceeds said multiple of the average current draw.

32. Mobile living quarters as claimed in claim 29, wherein a current comparator compares electrical current drawn by each of said actuators with a predetermined reference level and sets said in and out stop limits for each said actuator when the current drawn by one of said actuators exceeds the predetermined reference level.

33. Mobile living quarters comprising a frame, a fixed structure mounted on said frame defining main living quarters, an expandable structure movable relative to the fixed structure defining an auxiliary living volume, mounting means for mounting said expandable structure for movement between a retracted position retracted within the main living quarters and an extended position extended from the main living quarters, and a pair of independent actuators for effecting movement between the retracted and extended positions, each of said actuators including an operating member secured to said expandable structure and extending and retracting relative to the main living quarters to effect movement of the expandable structure between the extended and retracted positions, a position signal generator for generating position signals that vary in accordance with the position of the operating members, and control means for controlling said actuators in response to said position signals, said control means including setting means for setting in and out stop limits for said actuators, said setting means including a first switch for controlling a first one of said actuators independently of a second one of said actuators and a second switch for controlling the second one of said actuators independently of the first one of said actuators to permit each of said actuators to be moved independently to a desired stop limit, whereby said control means memorizes the position signals at said desired stop limits.

34. Mobile living quarters as claimed in claim 33, wherein said desired stop limits include room-in stop limits and room-out stop limits.

35. Mobile living quarters as claimed in claim 33, wherein said control means includes synchronizing means for controlling said actuators to assure that the operating members extend and retract at substantially the same rate, including calculating means for reading said position signals and calculating the difference between said position signals, and interrupting said first one of said actuators when the difference between the position signal of said first one of said actuators exceeds the position signal of the second one of said actuators by more than a predetermined offset.

36. Mobile living quarters as claimed in claim 35, wherein said in and out stop limits include room-in stop limits and room-out stop limits, and said control means being adapted to calibrate an offset reference equal to the difference between the position signals at the room-in stop limits.

37. Mobile living quarters as claimed in claim 35, wherein said desired stop limits include room-in stop limits and room-out stop limits, and said control means adapted to calibrate an offset reference equal to the difference between the position signals when the expandable structure is in a calibrating position, said calibrating position being a position other than a fully retracted position.

38. Mobile living quarters as claimed in claim 37, wherein said expandable structure is moved to the calibrating position by independently operating said first and second switches to move the expandable structure to a selected calibrating position, said calculating means forming the difference between said position signals and memorizing said difference as said offset reference.

39. Mobile living quarters comprising a frame, fixed structure mounted on said frame defining main living quarters, an expandable structure movable relative to the fixed structure defining auxiliary living quarters, means for mounting said expandable structure for sliding movement relative to the fixed structure for movement between a retracted position retracted within said fixed structure, to an extended position extended from the fixed structure, and a pair of independent actuators for effecting movement between the retracted and extended positions, each of said actuators including an operating member secured to the expandable structure and extending and retracting relative to the main living quarters to effect movement of the expandable structure between the extended and retracted positions, a first signal generator for generating a first position signal that varies in accordance with the position of the operating member of a first of said actuators and a second signal generator for generating a second position signal that varies in accordance with the position of the operating member of a second of said actuators, and a controller responsive to said position signals for turning off at least one of said actuators when the corresponding position signal indicates said expandable structure has attained a predetermined stopping position.

40. Mobile living quarters as claimed in claim 39, wherein the controller turns off said one of said actuators when the corresponding position signal indicates said expandable structure has attained a fully retracted position.

41. Mobile living quarters as claimed in claim 39, wherein the controller turns off said one of said actuators when the corresponding position signal indicates the expandable structure has attained a fully extended position.

42. Mobile living quarters as claimed in claim 32, wherein said controller includes a comparator for comparing said first position signal with a first room-out reference representing the value of the first position signal when said expandable structure is in the extended position and comparing said second position signal with a second room-out reference representing the value of the second position signal when the expandable structure is in the extended position, and a terminating means for terminating operation of said first of said actuators when a first corresponding position signal attains the first room-out reference and for terminating said second of said actuators when a second corresponding position signal attains the second room-out reference.

43. Mobile living quarters as claimed in claim 39, wherein said controller includes a comparator for comparing said first position signal with a first room-in reference representing the value of the first position signal when the expandable structure is in the retracted position and comparing said second position signal with a second room-in reference representing the value of the second position signal when the expandable structure is in the retracted position, and terminating means for terminating operation of said first of said actuators when the first position signal attains the first room-in reference and for terminating said second of said actuators when the second position signal attains the second room-in reference.

44. Mobile living quarters comprising a frame, a fixed structure mounted on said frame defining main living quarters, an expandable structure movable relative to the fixed structure defining an auxiliary living volume, mounting means for mounting said expandable structure for movement between a retracted position retracted within the main living quarters and an extended position extended from the main living quarters, and a pair of independent actuators for effecting movement between the retracted and extended positions, each of said actuators including an operating member secured to said expandable structure and extending and retracting relative to the main living quarters to effect movement of the expandable structure between the extended and retracted positions, position signal generating means for generating a position signal that varies in accordance with the position of the operating members, and control means for controlling said actuators in response to said position signals, said control means including synchronizing means for controlling said actuators to assure that the operating members extend and retract at substantially the same rate by maintaining a predetermined offset between said position signals, and means for setting said offset equal to the difference in said position signals when the operating members are advanced to a predetermined position.

45. Mobile living quarters as claimed in claim 44, wherein said control means includes setting means for setting said offset, said setting means including a first switch for controlling one of said actuators independently of the other of said actuators and a second switch for controlling said other of said actuators independently of the one actuator to permit each of said actuators to be moved independently to a desired position, and set means for causing said control means to memorize the difference between said position signals at said desired position as said offset.

46. Mobile living quarters comprising a frame, a structure mounted on said frame defining main living quarters, a slide out room defining auxiliary living quarters, mounting means for mounting said slide out room for sliding movement relative to the main living quarters for movement between a retracted position retracted within the main living quarters and an extended position extended from the main living quarters, and a pair of independent actuators for effecting movement between the retracted and extended positions, each of said actuators including an operating member secured to the slide out room and extending and retracting relative to the main living quarters to effect movement of the slide out room between the extended and retracted positions, a position signal generating means for generating a position signal that varies in accordance with the position of the operating members, and control means for controlling said actuators in response to said position signals to assure that the operating members extend and retract at substantially the same rate.

47. Mobile living quarters as claimed in claim 46, wherein said control means includes a comparator that compares said position signals and generates a first output signal when one of said position signals exceeds another of said position signals by a predetermined amount and generates second output signal when the other of said position signals exceeds said one position signal by a second predetermined amount, said control means including means for responding to said first and second output signals to affect the actuators.

48. Mobile living quarters as claimed in claim 46, wherein said position signal generating means includes a first signal generator for generating a first position signal that varies in accordance with the position of the operating member of one of said actuators and a second signal generator for generating a second position signal that varies in accordance with the position of the operating member of the other of said actuators, said control means including a comparator for comparing the first position signal with the second position signal, said control means further including means for affecting one of said actuators when the first position signal exceeds the second position signal by more than a predetermined amount and for affecting the other of said actuators when the second position signal exceeds the first position signal by more than a second predetermined amount.

49. Mobile living quarters as claimed in claim 46, wherein said control means compares the position signals with each other and generates a positive output signal when one of said position signals exceeds the other of said position signals and generates a negative output signal when the other of said position signals exceeds the one position signal, said control means being responsive to said positive output signal to affect the actuator generating said one position signal and to said negative output signal to affect the actuator generating the other of said position signals.

50. Mobile living quarters as claimed in claim 48, wherein said control means includes comparing means for comparing said first position signal with a first room-out reference representing the value of the first position signal when the slide out room is in the extended position and comparing said second position signal with a second room-out reference representing the value of the second position signal when the slide out room is in the extended position, and terminating means for terminating operation of one of said actuators when the first position signal attains the first room-out reference and for terminating the other of said actuators when the second position signal attains the second room-out reference.

51. Mobile living quarters as claimed in claimed in claim 50, wherein said control means includes a comparing device for comparing said first position signal with a first room-in reference representing the value of the first position signal when the slide out room is in the retracted position and comparing said second position signal with a second room-in reference representing the value of the second position signal when the slide out room is in the retracted position, said control means including terminating means for terminating operation of the one of said actuators when the first position signal attains the first room-in reference and for terminating the other of said actuators when the second position signal attains the second room-in reference.

52. Mobile living quarters as claimed in claimed 48, wherein said control means compares said first position signal with a first room-in reference representing the value of the first position signal when the slide out room is in the retracted position and comparing said second position signal with a second room-in reference representing the value of the second position signal when the slide out room is in the retracted position, said control means including terminating means for terminating operation of the one of said actuators when the first position signal attains the first room-in reference and for terminating the other of said actuator when the second position signal attains the second room-in reference.

* * * * *

UNITED STATES PATENT AND TRADEMARK OFFICE
CERTIFICATE OF CORRECTION

PATENT NO. : 6,345,854  
DATED : February 12, 2002  
INVENTOR(S) : Patrick W. McManus Page 1 of 1

It is certified that error appears in the above-identified patent and that said Letters Patent is hereby corrected as shown below:

Column 15,
Line 20, insert -- said -- after "between"

Column 17,
Line 21, insert -- being -- after "means"

Column 19,
Line 15, insert -- a -- after "generates"

Signed and Sealed this

Twenty-first Day of May, 2002

Attest:

JAMES E. ROGAN
Director of the United States Patent and Trademark Office

Attesting Officer